United States Patent [19]

Suzuki

[11] Patent Number: 5,512,022
[45] Date of Patent: Apr. 30, 1996

[54] MOTOR MECHANISM

[76] Inventor: Naruhito Suzuki, 12-23-1113, 3-Choume Ohyata, Tokyo, 120, Japan

[21] Appl. No.: 328,656

[22] Filed: Oct. 25, 1994

[30] Foreign Application Priority Data

Oct. 26, 1993 [JP] Japan .................................. 5-267050

[51] Int. Cl.$^6$ ..................................................... B60L 7/00
[52] U.S. Cl. ............................................. 475/2; 475/5; 475/9
[58] Field of Search ........................... 475/2, 5, 9; 477/3, 477/4

[56] References Cited

U.S. PATENT DOCUMENTS

| | | | |
|---|---|---|---|
| 3,726,150 | 4/1973 | Ikeda | 475/9 |
| 4,354,144 | 10/1982 | McCarthy | 477/3 |
| 4,729,258 | 3/1988 | Mohri et al. | 475/9 |
| 5,067,932 | 11/1991 | Edwards | 475/9 |
| 5,419,406 | 5/1995 | Kawamoto et al. | 475/5 |

*Primary Examiner*—Dirk Wright
*Attorney, Agent, or Firm*—Hoffman, Wasson & Gitler

[57] ABSTRACT

The present invention is directed to a motor mechanism provided with first and second motor units as well as a differential gear unit. The differential gear unit is provided with three rotating members which are engaged mutually and rotate in constant differential ratio rates. One of the rotating shafts is provided in one of the motors, and a second of these rotating shafts is provided in the second motor. A differential pinion gear rotation axle shaft corresponds to the third rotating shaft. The differential gear unit will cause a drive axle shaft to rotate. The rotating shaft of the first motor rotates at a differential speed with respect to the rotating shaft of the second motor which is due to the difference of revolution between the differential gear axle and the revolution of the rotating shafts of both first and second motors.

17 Claims, 19 Drawing Sheets

T : TORQUE

NUMBER OF REVOLUTION

T-N CURVE

NUMBER OF REVOLUTION

I : CURRENT

T : TORQUE

T-N CURVE

FIG.20

AUTOMATIC DRIVING CONTROL DEVICE (INPUT SIGNALS)

| | | 1 | 2 | 3 | 4 | 5 | 6 | 7 | 8 | 9 | 10 | 11 | 12 |
|---|---|---|---|---|---|---|---|---|---|---|---|---|---|
| BRAKE | ON | ◎ | | ◎ | | ◎ | | ◎ | | ◎ | | ◎ | |
| | OFF | | ◎ | | ◎ | | ◎ | | ◎ | | ◎ | | ◎ |
| ACCELERATE | ON | ◎ | ◎ | | | ◎ | ◎ | | | ◎ | ◎ | | |
| | OFF | | | ◎ | ◎ | | | ◎ | ◎ | | | ◎ | ◎ |
| SPEED | HIGH | ◎ | ◎ | ◎ | ◎ | | | | | | | | |
| | MEDIAM | | | | | ◎ | ◎ | ◎ | ◎ | | | | |
| | LOW | | | | | | | | | ◎ | ◎ | ◎ | ◎ |
| RANGE | P | 6 | 6 | 6 | 6 | 6 | 6 | 6 | 6 | 6 | 6 | 6 | 6 |
| | B | 5 | 4 | 5 | 5 | 5 | 4 | 5 | 5 | 5 | 4 | 5 | 5 |
| | N | 5 | 5 | 5 | 5 | 5 | 5 | 5 | 5 | 5 | 5 | 5 | 5 |
| | D | 3 | 2 | 3 | 5 | 3 | * | 3 | * | 5 | 1 | 5 | 5 |
| | 1 | 3 | 1 | 3 | 5 | 3 | 1 | 3 | 1 | 5 | 1 | 5 | 5 |
| | 2 | 3 | 2 | 3 | 5 | 3 | 2 | 3 | 2 | 5 | 1 | 5 | 5 |

(OUTPUT) PATTERN CONTROL SIGNALS

| | | M1 PATTERN CONTROL SIGNALS | M2 PATTERN CONTROL SIGNALS |
|---|---|---|---|
| 1 | LOW SPEED MODE | 1 DRIVE | 4 REVERSE REGENERATE |
| 2 | HIGH SPEED MODE | 1 DRIVE | 1 SAME DRIVE |
| 3 | BRAKE MODE | 2 REGENERATE | 3 SAME REGENERATE |
| 4 | BACKWARD MODE | 2 REGENERATE | 2 REVERSE DRIVE |
| 5 | IDLING MODE | 1 DRIVE | 5 OPEN |
| 6 | OFF MODE | 3 OPEN | 5 OPEN |
| * | MAINTAINING | - | - |

MOTOR MECHANISM

BACKGROUND OF THE INVENTION

1. Field of the Invention

The present invention relates to a motor mechanism which can be generally utilized as a motor for all kinds of industries, particularly, for a vehicle. Further, it can be used a speed changer.

2. Description of the Prior Art

A power motor having a wide range of power revolution (rotation) number and power torque, especially an electric motor means used as a driving means for a vehicle can be used without any speed change gear, directly driving, or used through a speed change gear. In the prior art motor, when no speed change gear is used for directly driving, it is difficult to control in the range of low speed because the internal resistance is lower of the high performance motor.

A power of a motor can be controlled or adjusted by raising or lowering a voltage being applied or by switching on-off. Higher the voltage being applied is, higher the power of a motor is. The power of the motor can be lowered by reducing the voltage applied. The current flowing in the circuit will change in proportion to the voltage. Therefore, the increase of the voltage will increase the current amount. Where the voltage is the same, lower the resistance is, higher the current flows so that the power of the motor will increase.

The torque generated by a motor will increase proportionally to the current. Further, When the velocity of a vehicle should be raised in driving on a flat road, the voltage should be increased to raise the revolution number. When the the velocity should be constant even in climbing up a slope road, the voltage should be increased so as to raise the torque with maintaining the speed of the vehicle. Then, the velocity and the torque can be changed in combination by adjusting the voltage applied to the motor. This is corresponding to that the revolution (rotation) number and the torque of the motor can be changed by pressing an accelerating plate.

A motor gives maximum torque at the time when the revolution number is 0. The higher the revolution number is, the lower the torque becomes. When the high speed rotation is without any load, the torque will be less and approach to 0. Such relationship of T-N can be indicated in a graph of FIG. 1 showing that the revolution number will decrease when the torque increases. Another feature of the motor is a T-I curve as shown in FIG. 2, indicating that the increase of T will increase in proportion with I. That is, the higher the torque is, the higher the consumption of the current will be, so as to raise the current, thereby increasing the torque. Then, a high performance motor will have sharper slope of the curve T-N. The maximum torque of high performance motor will be 4.5 times of that of a regular motor, and therefore, higher current will flow in such high performance motor. The torque T is T=KI, where K is torque constant, I is current, E is voltage, and the resistance of the motor is R. Then, I=E/R, and the energy loss generated by flowing an electric current through a motor is $W=R \times I^2$, generating a heat within coils in the motor. Especially, in a high performance motor, a maximum torque (traction) can be maintained for long period of time at the revolution number of 0, but a very large current will flow in the motor, resulting in excessive heating to be short-circuited possibly into firing. A high performance motor has relatively low resistance so that electric current flows easily, and then, it is very difficult to operate at the lower rotation number. Further, a high performance motor in which eddy currents and copper loss and excessive heat will occur in the range of the revolution number to be cut is difficult to be operated. When the revolution is reduced, higher current flows in the motor. Therefore, a high performance motor requires a current control circuit. It is possible to fail controlling an excessive current by noise or some circuit fail, and then the motor can be broken by the excessive current, and it is difficult to operate smoothly a high performance motor.

Generally speaking, there is a drastic change of load when a power motor is used under high loading condition in a wide rotation range. For example, when reverse rotation force is loaded on the final driving shaft, an excessive current is applied on the motor to be broken or a overloading is applied on a source controlling system. A voltage control will enable to adjust the rotation speed and the torque as applied on the final driving shaft, but it needs detecting the rotation and the torque as applied. When some heating will loose controlling of the motor, the motor will be broken or a source circuit will be overloaded. Further, when responsibility is not good, an excessive power consumption will be higher.

A high power motor is difficult to operate at the time of zero revolution number and high torque loaded, and further, it needs high power, and then, a heat-proof or heat-prevention means will be complicated, and costly, and further it will raise a possibility of errors.

There is disclosed in Japanese Patent Application Laid-open gazette No. 4-185,205/1994 a motor means in which one motor can be used as a generator to regenerate. This motor means has a motor, a driving circuit, a driving battery, a helping battery, a regenerative adjusting means including a control circuit; and further a regenerative alternating means, a regenerating means of regenerating a power generated by a motor into a driving battery and a regenerating means of regenerating a power generated by a motor into a helping battery.

SUMMARY OF THE INVENTION

Accordingly, an object of the present invention is to provide a motor mechanism in which the good features—good torque—revolution number property is maintained, but disadvantage of a motor, especially a DC motor is removed, i.e. the excessive current and loss at zero revolution, or lower revolution number is removed by mechanical means without electrical source adjustment.

It is another object of the present invention to provide a motor mechanism in which rotation of motors can be maintained even when an output driving shaft is stopped or exerted by reverse rotation force.

It is still another object of the present invention to provide an motor mechanism without any source adjustment such as voltage control, in which mechanical controlling can enable to maintain an ordinary rotation of motor even when an output driving final shaft is stopped or exerted by reverse force, by adjusting distribution of force to a generator motor.

BRIEF DESCRIPTION OF THE DRAWINGS

The objects and features of the present invention will become more apparent from the consideration of the following detailed description taken in conjunction with the accompanying drawings in which:

FIG. 20 is a table showing the control modes for electronically automatic driving of a vehicle using the inventive motor mechanism.

DETAILED DESCRIPTION OF PREFERRED EMBODIMENTS

Figure 1:
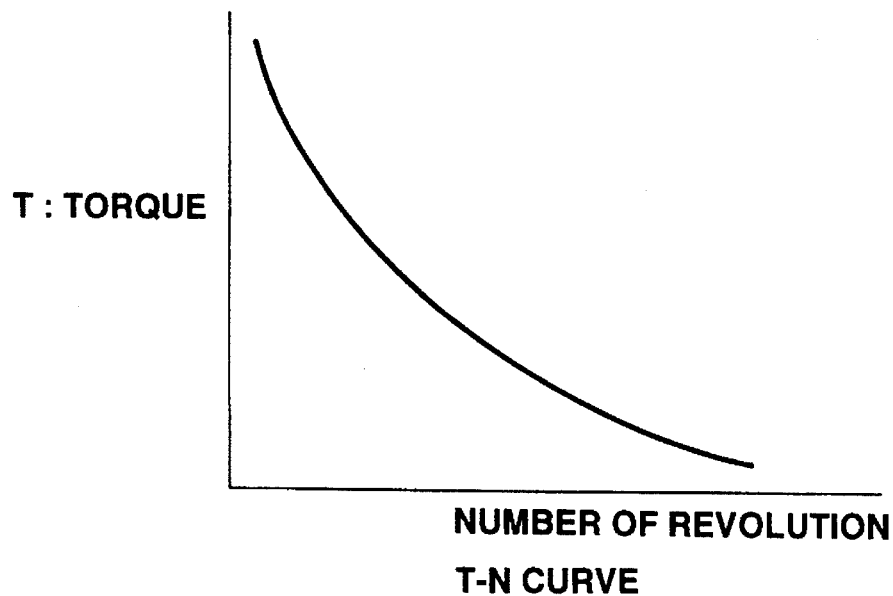
FIG. 1 shows generally a graph of T-N (torque—number of revolution) of the prior art motor.
Figure 2:
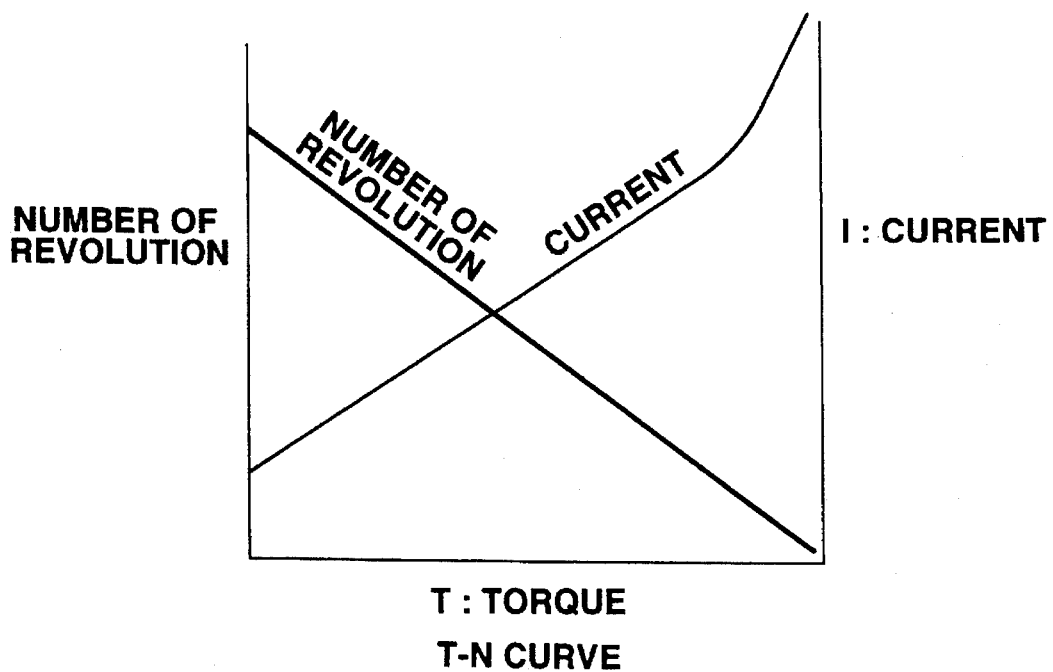
FIG. 2 is a graph schematically showing a relationship of N-T curve and current in the prior art motor.

In accordance with the present invention, there is provided a motor mechanism which comprises a first motor; a second motor; and a differential gear unit; wherein the differential gear unit essentially consists of three rotating members which are engaged mutually and rotate in constant differential ratio rates; the differential ratio being determined by the ratio of tooth numbers of gears mutually engaged; a rotating shaft of the first motor corresponds to one of three members of the diferential gear unit; a rotating shaft of the second motor corresponds to the other one of e three members of the diferential gear unit; a differential pinion gear rotation axle shaft corresponding to the another of three members of the diferential gear unit will empower a drive axle shaft; and further, the rotating shaft of the first motor rotates in the differential speed with the rotating shaft of the second motor; the difference of the revolution which is proportional to the difference between the revolution of the differential gear axle and the revolution of the rotating shaft of the first motor is generated between the revolution of differential gear axle and the revolution of the rotating shaft of the second motor so that when the difference is 0, the shafts of the first motor and second motor and the differential gear axle turn at the same rotation speed.

In accordance with the present invention, a differential gear unit is a planetary gear system which has three rotating members, i.e. internal gear, a sun gear and planet pinion set essentially consisting of planet pinions and a planet pinion carrier or cage mounted with a plurality of planet pinions engaged to the internal gear and the sun gear, an internal gear and said sun gear are respectively connected to each of shafts of the first motor and the second motor, and a shaft of said planet pinion carrier is an output driving shaft.

In accordance with the present invention, further the differential gear unit is a differential gear box which has two differential side gears, and a plurality of pinion gears engaged to both of the side gears, and mounted on a differential pinion carrier rotating around coaxially to both side gears, wherein the rotating shafts of the first and second motors are respectively connected to said two side gears, and the differential pinion carrier rotates in connection with an output shaft for driving.

In accordance with the present invention, the rotating shafts of the first and second motors and the differential pinion carrier shaft are coaxially arranged so that the first and second motors and the differential gear unit are integrated in one case or in one wheel.

Further, the first motor is electrically connected to an electric source so as to act as a driving motor, and the second motor is electrically connected to a regenerator so as to function as a generator, said regenerator can recover or consume a power generated by the second motor, and the first motor rotates reversely to the rotation of the second motor so as to give a driving torque to a driving shaft. In accordance with one embodiment of the present invention, the first motor is electrically connected to an electric source so as to act as a driving motor, and the second motor is electrically connected to a regenerator so as to function as a generator, a power generated by the second motor is regenerated through raising voltage circuit thereof, and adjusting the power, so as to regenerate the power.

In accordance with the present invention, the power generated by the second motor returns through a backstop circuit directly to the first motor. An excessive power from the first motor can be appropriately distributed to the second motor to recover the excessive energy, and then a very efficient motor mechanism can be provided.

Further, a first motor; a second motor; and a differential gear unit are provided wherein a rotating shaft of the first motor connects through the differential gear unit a rotating shaft of the second motor; a differential gear rotation axle of the differential gear unit empowers driving axle(s); and the rotating shaft of the first motor rotates differentially in regard with the rotating shaft of the second motor; the difference of the rotation which is proportional to the difference between the rotation of the differential gear axle and the rotation of the rotating shaft of the first motor is generated between the rotation of differential gear axle and the rotation of the rotating shaft of the second motor so that when the difference is 0 the shafts of the first motor and second motor and the differential gear axle turn at the same rotation speed; each of the first and second motors has a drive and regenerative switching means which switches to connect to a source or a regenerator in accordance with a given pattern, thereby the first and second motors function as a driving motor or a generator.

In accordance with the present invention, a low speed mode is in which said either of the first and second motors acts as a driving motor, and a high speed mode is in which both of the first and second motors acts as a driving motor, and the switching means can switch from the low speed mode to the high speed mode. In one embodiment, the rotating shaft of the first motor is connected through the differential gear unit to the rotating shaft of the second motor; the driving torque is given from the differential pinion carrier shaft of the differential gear unit; the rotating shaft of the first motor rotates differentially to the rotating shaft of the second motor; further a rotating shaft of the first motor connects through the differential gear unit a rotating shaft of the second motor; a differential gear rotation axle of the differential gear unit empowers driving axle(s); and the rotating shaft of the first motor rotates differentially in regard with the rotating shaft of the second motor; the difference of the revolution which is proportional to the difference between the revolution of the differential gear axle and the revolution of the rotating shaft of the first motor is generated between the revolution of differential gear axle and the revolution of the rotating shaft of the second motor so that when the difference is 0 the shafts of the first motor and second motor and the differential gear axle turn at the same revolution speed; each of the first and second motors has a drive and regenerative switching means which switches to connect to a source or a regenerator in accordance with a given pattern, thereby the first and second motors function as a driving motor or a generator in accordance with the signals such as braking signal, accelerating signal, speed lebelling signal and range signal, so as to operate automatically, and then, those signals transmits through interval circuit to said drive and regenerative switching means, the interval circuit can provide a period time for converting the rotation direction of the second motor shaft.

The inventive motor mechanism is an invention of motor means, and is most appropriate for use in power source for electrically driven vehicle, and further can be used a power supply means for general industries.

Figure 3:
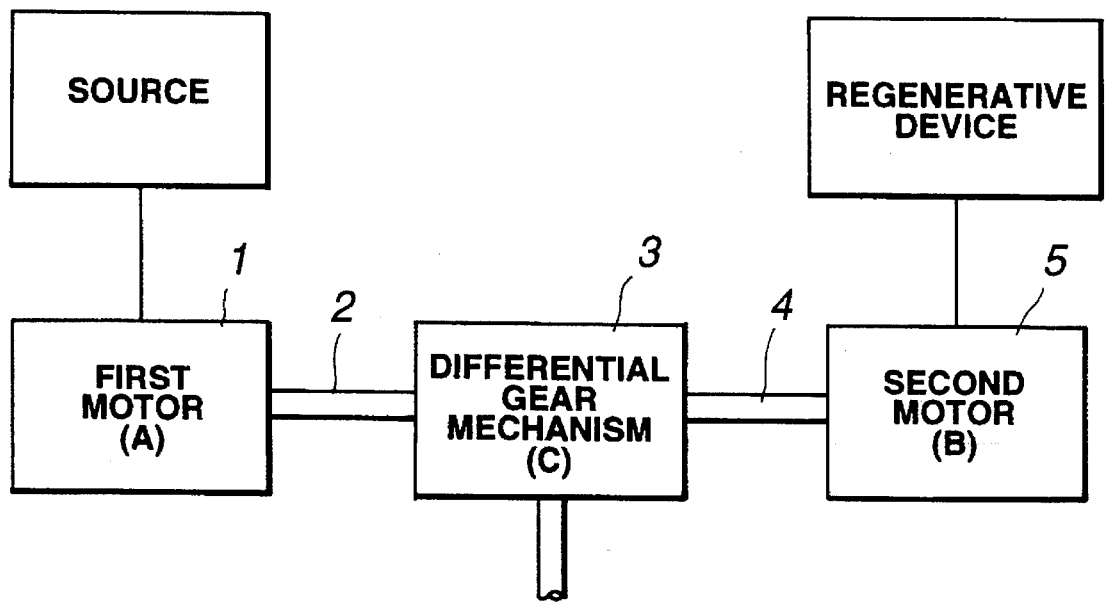
FIG. 3 shows schematically a composition of an example of the motor mechanism in accordance with the present invention.

FIG. 3 shows a structure of our motor mechanism comprising two motors, i.e. a first motor for driving and a second motor for generating, where the two motors rotate mutually reversely, and a differential output from the difference between the revolution rotation) of the first motor and the revolution of the second motor is generated from a differential gear unit. Such motor mechanism is appropriate generally for generic power motor, and further, is preferable for utilization in an electric vehicle.

Figure 6:
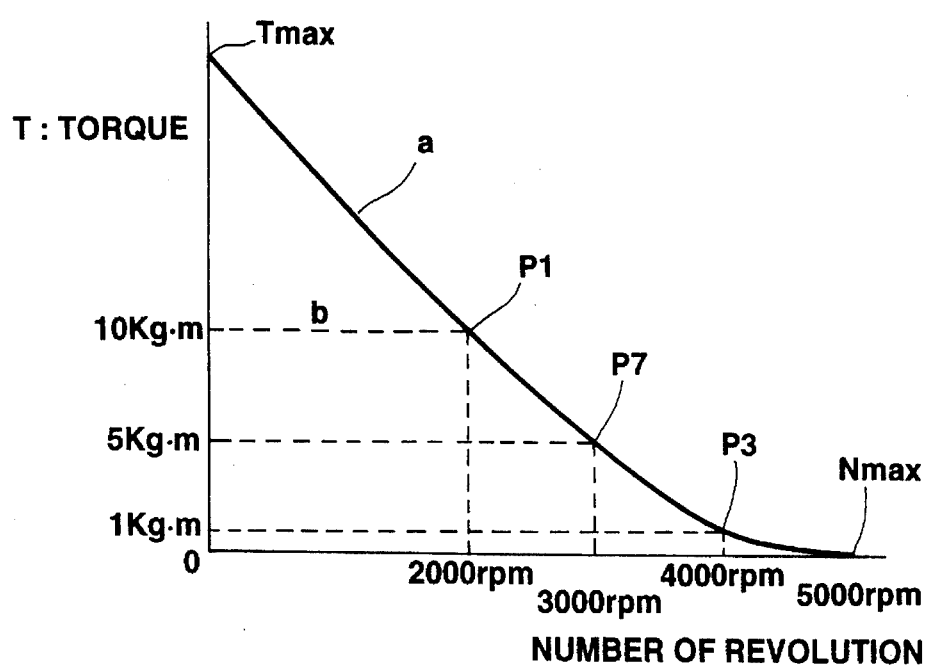
FIG. 6 is a graph showing the relationship of torque and number of revolution of the first motor in the inventive motor mechanism.

Next, the relation with an operation curve of a motor will be explained further. For example, a DC motor is operated as shown in FIG. 6, cutting a raise of torque in the range approximate to the number of revolution=0. The voltage to be applied to a motor is indicated by V, the total magnetic flux applied to the effective area of the the magnetic field generated by a strength of the magnetic field of the motor is indicated by $\phi$, a number of turns in the coil of the motor is Z, and the resistance of the motor is R. The maximum value of the revolution (rotation) number $N_{max}=V/\phi \times Z$, and the maximum value of the torque; $T_{max}=\phi ZV/R$.

As shown in FIG. 6, the curve connecting from the point of $N_{max}$ at a coordinate of revolution number to the point of $T_{max}$ at a coordinate of torque indicates the character of revolution number—torque relation. As shown in FIG. 6, the torque will lower along with the increase of the revolution number. V is a voltage of a battery, and then, when the voltage is two times of the original value, the maximum torque as well as the maximum revolution number become two times of the original value. The $\phi$ value will be higher, when the magnet is stronger, and then when the size of the motor is larger, the $\phi$ value is higher. If the size is the same, the number of winds in the coils can be adjusted so as to have maximum torque, and maximum revolution number.

On the hands, the torque T is generated in proportion to the current I flowing a motor, when the current is low. The proportional constant is a multiplication value of $\phi \times Z$. When the current becomes higher, the raise rate of torque will be getting lower. That is a saturation phenomenon.

The ratio of the differential gears used in the inventive motor mechanism is X. The ratio of the differential gears is 1:1, then X=1. Further, when the ratio of the differential gears is 2:1, X=2. The teeth number ratio of the differential gears at the first motor side is X, and the teeth number ratio of the differential gears at the second motor side is 1. The torque and the revolution number of the first motor are respectively $T_1$ and $N_1$, and the output torque and the revolution number of the output shaft are respectively $T_2$ and $N_2$, and the torque and the revolution number of the second motor are respectively $T_3$ and $N_3$.

$$(X+1)T_1=T_2 \tag{1}$$

$$(N_1-XN_3)/(X+1)=N_2 \tag{2}$$

Therefore, the mechanical output power by the first motor will be a multiplication of revolution number (rpm)×torque, and then, $T_1 \times N_1$ provided that there is no friction loss. The mechanical output power from the second motor will be a multiplication of revolution number (rpm)×torque, and then, $T_3 \times N_3$.

Therefore, the mechanical output power of the final driving shaft will be a multiplication of revolution number (rpm)×torque, and then, $T_2 \times N_2$. Accordingly, $$T_2 \times N_2 = T_1 \times N_1 - T_3 \times N_3 \tag{3}$$

Then, the torque of the driving shaft is twice of the torque of the driving (first) motor where X=1. The revolution number $N_2$ is a half of the revolution number of the first motor when the revolution of the second motor is zero, i.e. does not rotate, and X=1.

Therefore, the relationship of torques of the first and second motors is $$XT_1 = T_3 \quad (6)$$

Then, the output power from the second motor will raise and lower so as to change the consuming torques, and then, assuming that the load resistance is constant.

When starting (or stopping), the rotation torque is as follows; because the revolution number is "0", and the equation (3).

$$0 = T_1 \times N_1 - T_3 \times N_3 \quad (A)$$

Then, from the equation (6), $$T_1 = T_3 \quad (B).$$

Then, the rotation torque and revolution number are determined from balancing of the consideration of (A) and (B).

The first motor and the second motor are connected through a differential gear unit, so that the output power is given from the differential gear unit. The first and second motors rotate differentially so that the rotation speed difference proportional to the difference between the rotation speed of the output driving shaft and that of the first motor is generated between the output driving shaft and the second motor. For example, the first motor rotates at the speed of 2000 rpm, and the output driving shaft rotates at the speed of 1000 rpm where the ratio of differential gear teeth numbers is 1:1, and then, the second motor rotates at the zero speed. Similarly, when the output driving shaft rotates at zero speed, the second motor rotates at a reverse 2000 rpm. As apparent from FIG. 1, the output driving shaft 3 rotates at the rotation speed proportional to the certain ratio of the revolution number between (2) shaft and (4) shaft to the revolution number between (3) shaft and (4) shaft. That is, where the ratio of the differential gear ratio is 1:1, the shafts rotates to keep that the difference between the revolution number between (2) shaft and (4) shaft to the revolution number between (3) shaft and (4) shaft is 1:1.

An electric motor, especially a high performance motor with lower internal resistance will be exposed to an excessive current when rotates at zero rotation speed, thereby allowing a possibility of breaking the motor. Further, a quite power would be lost. In an ordinary case, a current would be restricted as shown in FIG. 6, from the curve a to the curve b of the fist motor. That is, the current in the range of lower revolution number is generally cut off. As shown in FIG. 6, the torque will increase drastically to unlimited, when the revolution number approaches to zero. In the range lower than P1 of the revolution number in FIG. 6, the current is restricted as shown in FIG. 6, in consideration of saturated magnetic flux. The maximum torque occurs at the revolution number of P1,' and the torque can not increase even when the revolution number is reduced.

Therefore, a linear torque feature can not be in the prior art motor means. Further, the current flows excessively so as to break possibly the motor. Further, because the current is restricted, the torque would be restricted so that the motor will be less efficient. The range of high torque and low revolution number will affect a copper loss, and energy loss.

In the inventive motor mechanism, the first motor rotates up to the stationary rotation, and a power is not taken out with less loading of the second motor. This situation is an idling condition. Power and torque do not occur so much. The value of the torque will be a driving torque of the final driving shaft, and therefore, the mechanical resistance will generate some torque when the second motor is not rotated.

The rotation may be neglected because the torque is zero. Under this idling condition, the motor will rotate with the torque of zero rotation. Therefore, it can start with high torque, and zero revolution number.

Under the idling condition, the output driving shaft rotates zero, and then the second motor rotates reversely. A power generated by the second motor will be taken out, so as to increase the torque of the second motor. Then, the revolution number of the first motor will be decreased to balance the torque of the second motor to be rotated. That is, the torque of the first motor will be balanced with the torque of the second motor to be rotated, so that the first motor should have the revolution number to result in the balanced torque.

The torque and the revolution number of the first motor under this balanced situation is utilized to generate the power in the second motor. The power of the driving shaft is zero because of the zero revolution number, but the torque of the shaft is high and the sum of the torque of the first motor and the torque consumed in the second motor.

When the revolution number of the output driving shaft is zero, the torque will be added, and then, the higher starting torque can be obtained.

Further, in this situation, the motor can be adjusted to keep an efficient revolution number. In addition, the second motor generates at the same time a power, which is of significance.

After the output driving shaft starts to rotate from zero revolution, the revolution number raises from zero to a certain level, because the ratio of the revolution number of the first motor to that of the second motor is constant, the difference between the revolution number of the first motor and that of the output driving final shaft will be reduced or shrunken, and then, the revolution number of the second motor will be reduced. Then, the reduced revolution number of the second motor with reduced torque is balanced with the revolution number and the torque of the first motor, and then, automatically balanced among them.

Accordingly, the number of revolution of the first motor will change depending on the loading of the output shaft, and its number of revolution, and the torque and revolution number of the second motor. When the number of revolution of the output driving shaft is zero, i.e. the shaft is stopped, all power of the first motor will be consumed in the second motor.

When it starts, the power of the first motor will be distributed by the differential gear unit. Further, when it is braked or runs a downward slope, the load of the driving final shaft will be minus or negative force. In this case, the first motor can be a generating braking motor or regenerative motor so that energy can be recovered from both motors. In this case, the second motor will rotate forwardly, not reversely.

Even when the driving final shaft rotates zero, the driving motor can maintain a high number of revolution. Therefore, the excessive current due to lowering of the number of revolution of the driving motor can be avoided so as to save the unnecessary increase of consumption of power. The generating motor will rotates in such way that the difference of rotation speeds between the driving motor and the output driving shaft is the difference of rotation speeds between the generating motor and the output driving shaft where the ratio of differential gears is 1:1. Then, the generating motor will generate the power, which can be regenerated, and therefore, the motor mechanism can effect good efficiency. Further, if the power as generated is regenerated directly into the driving motor, the torque will be raised when starting or in the low speed range.

Further, the mechanism can enable to restrict the number of revolution of the driving (first) motor to a constant revolution number range by absorbing the change of the revolution number of the final driving shaft into the revolution speed of the generator motor, and reversely enable to absorb the change of the revolution number of the generator motor into the driving motor so as to maintain a constance revolution number of the generator motor.

The inventive motor mechanism will distribute appropriately a driving force of the driving motor through a differential gear unit to an output driving final shaft and a generator motor (the second motor) in such way that the difference between the power of the driving motor and the power of the output driving final shaft. The power as generated by the second motor can be regenerated so as to save the power consumed finally in the motor mechanism. Therefore, the torque character can be adjusted by changing a power as regenerated. This torque character is proportional to the current I and the magnetic flux $\phi$, and therefore, can be adjusted by adjusting the current or the magnetic flux in the prior art. However, the inventive mechanism can enable to adjust the output power by changing the power as regenerated.

Next, the function of the mechanism will be illustrated in reference of the graphs. The numeric values are only for reference.

Figure 7:
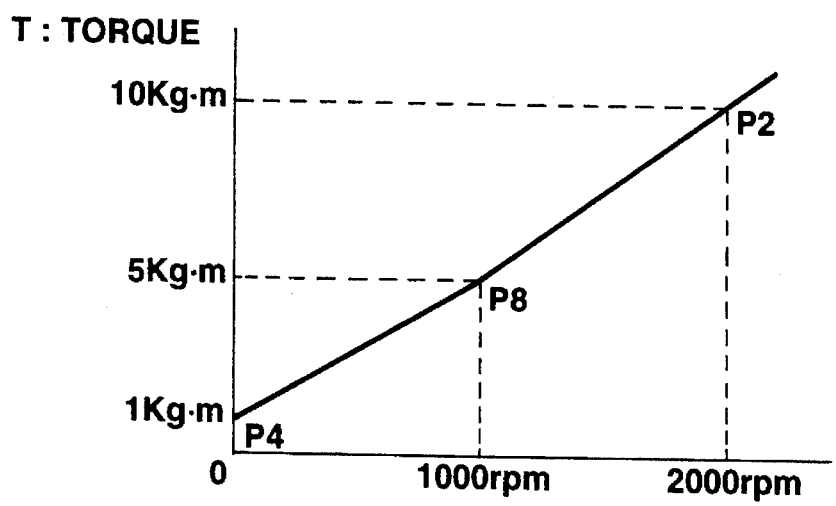
FIG. 7 is a graph showing schematically the relationship of torque and number of revolution of the second motor in the inventive motor mechanism.
Figure 8:
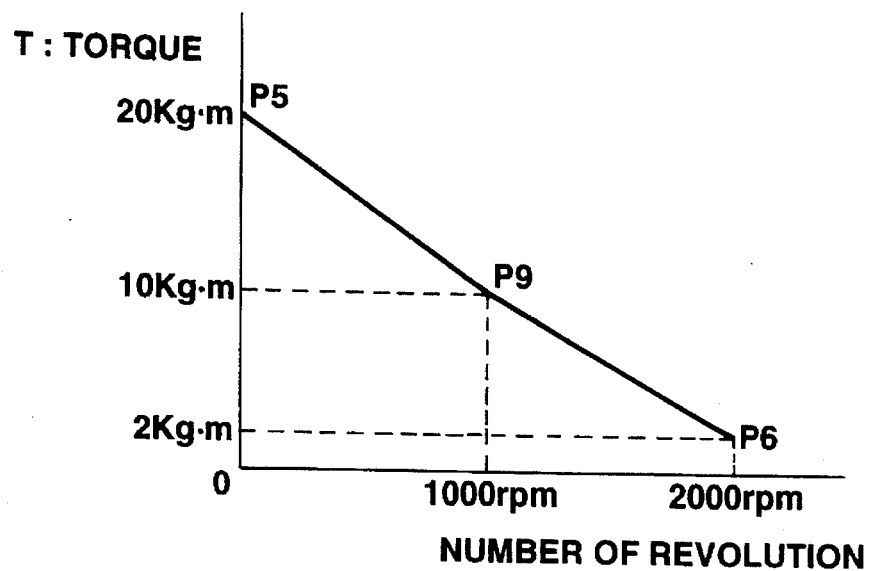
FIG. 8 is a graph showing schematically the relation of torque and number of revolution of the output shaft in the inventive motor mechanism.

Only for simplification of explanation, the ratio of the rotation numbers in the differential gear unit is 1:1. The curve of the torque—the number of revolution of the first motor is as a T-N curve shown in FIG. 6, in the changing curve of the torque—the number of revolution of the second motor, that is shown in FIG. 7, in a consuming curve of the torque—number of revolution. As shown, the first motor A will raise the number of revolution with decrease of the torque, and the number of revolution of the second motor B will increase with the torque increase. As shown in FIG. 8, when the second motor is actuated to drive, the raise of number of revolution will decrease the torque.

The number of revolution of the output driving shaft will raise from the left to the right, and each of P points is shown in the graph as follows.

|              | the point in the graph | | |
|--------------|-----|-----|-----|
| first motor  | P1  | P7  | P3  |
| second motor | P2  | P8  | P4  |
| output shaft | P5  | P9  | P6  |

At the time when starting, the revolution number of the output shaft is "0", and then, where the ratio of the teeth numbers in the differential gear unit is 1:1, the shaft of the second motor B rotates reversely to the rotation of the second motor, at the same revolution number as that of the first motor A. When the voltage of 100 V is applied to the first motor, the first motor A rotates so as to rotate reversely the second motor. B, and then, at the point P1; revolution number of 2000 rpm, the torque of the first motor becomes the torque of the second motor, so as to balance ($T_1=T_3$: from the equation (5)). Assuming that mechanical energy loss is zero, at this time, the torque of the output shaft as generated is twofold of the torque of the first motor A; 10 kg m (P1); that is 20 kg m in the torque (P5) from the estimation of the equation (1); $(x+1)T_1=T_2$.

Further, a power energy of the first motor A is put into an energy as generated by the second motor B, and therefore, an energy loss will be lesser (from the equation A; $0=T_1\times N_1+T_3\times N_3$). At this time, even where the higher torque of 20 kgm (P5) at the revolution number of 0 is generated, the shaft of the first motor A will rotate so that the excessive current is not occurred so as to effect an ordinary operation of the motor.

After the vehicle starts, the revolution (rotation) number of the output shaft becomes 1,000 rpm (P9), and then, the revolution number and the torques of the driving motor and generating motor are such that when the ratio of teeth in the differential gears is 1:1, the torques of the first and second motors are the same in balance, and therefore, the first motor has the revolution number of 3000 rpm and the torque of 5 kg-m, corresponding to P7, as estimated from the equations (1), (2) and (5), and the second motor has a revolution number of 1000 rpm (reverse to the revolution of the first motor), a torque of 7 kg-m (P8). At this time, the torque of the output shaft becomes 10 kg-m (Pg), two-fold of the torque of the first motor (P7). When the driving (first):motor is at P3, the generating (second) motor is at P4, and the output shaft is at P6. Similarly, the driving motor (T-N curve of FIG. 6) and the generating motor (T-N curve of FIG. 7) and the driving power of the output shaft are in balance, and then, the power as shown in FIG. 8 is generated.

Figure 9:
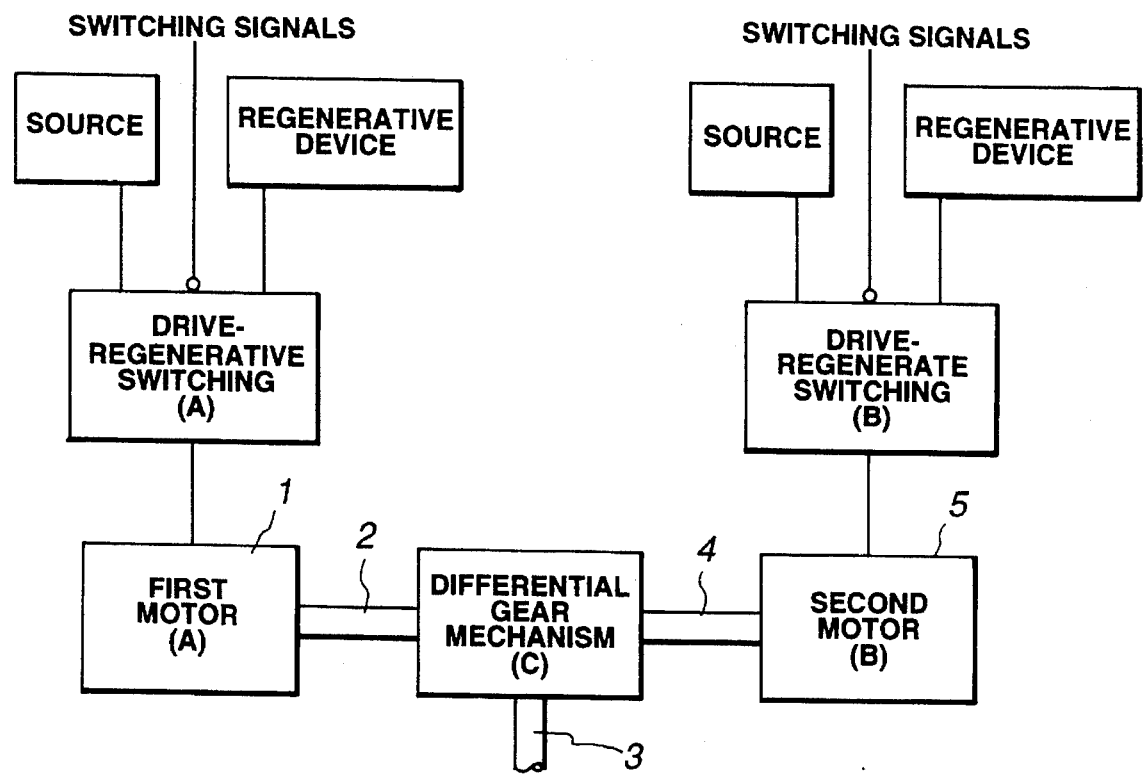
FIG. 9 shows schematically a composition of one example of the inventive motor mechanism.

FIG. 9 shows schematically the structure of the inventive motor mechanism having two motors in combination. This structure is appropriate to a power source for electric vehicle, but can be used generally for generic motor driving means. The first motor connects through a differential gear mechanism a second motor, and each motor can be used for driving as well as generating, which can provide efficient power for driving with changing the speed and the torque along with the driving conditions.

The first and second motors are functionally and structurally symmetrical in term of a differential gear mechanism, and then, either one can be for driving and generating. Further, both of the motors can rotate in the same direction, for driving or generating (braking). Further, both of two motor turn in the same direction, to be used as a generator, thereby, regenerative braking.

The inventive motor mechanism can have three modes; the first mode when starting, efficient driving-generating mode; the second mode with a high speed driving-driving; the third mode with generating-generating for braking. The combination of those three modes can enable to change a driving condition, thereby providing appropriate driving force and efficiency to the driving conditions, and operation conditions.

As shown in FIG. 9, the first motor A and the second motor B are respectively with switching means SWA and SWB, through which each motor is connected to each of sources SOA and SOB, and each of regenerative means GA and GB. Switching means SWA and SWB are operated respectively by switching signals, so as to alternate connections to a source or a regenerative means. Each of terminals of electric inputs to each of motors is connected to each of the switching means.

Then, the first and second motors have the relationship with three modes as shown in the following table.

|        | Switch A | Switch B |
|--------|----------|----------|
| mode 1 | forward source- motor (drive) | regenerating motor (generate) |

-continued

|  | Switch A | Switch B |
|---|---|---|
|  | backward regenerate- motor (generate) |  |
| mode 2 | forward source- motor (drive) | source motor (drive) |
| mode 3 | forward regenerate- motor (generate) | regerate- motor (generate) |

In the mode 1, the shafts of the first and second motors rotates mutually reversely. In this mode, the efficiency of the motor is good in the range of low speed operation needing higher torque for starting.

In the mode 2, both of the first and second motors are energized from a source, and rotate in the same rotation direction, and then, a final driving shaft will rotate by the sum of driving forces of the first and second motors so as to enable high speed rotation. That is, a raise of output power rotation will increase a revolution number of a driving motor so as to increase relatively the efficiency of motors in other case than mode 1. Therefore, in high rotation, the efficiency difference is lower, and then, the merit resides in driving by both motors.

Further, in mode 3, both of the first and second motors will rotate in the same direction, but, act as a generator, so as to brake the rotation. Mode 3 is under a braking condition.

The ratio of teeth numbers between the gears of the differential gear unit is X, and then, the ratio is 1:1, X=1, and 2:1 is X=2. In mode 1, the first motor rotates in reverse direction to that of the second motor. The torque and revolution number of the first motor are respectively indicated by $T_1$ and $N_1$, while the torque and revolution number of the output driving shaft are respectively indicated by $T_2$ and $N_2$, and then, the torque and revolution number of the second motor are respectively indicated by $T_3$ and $N_3$, and have the following relationship.

$$(X+1)T_1 = T_2 \qquad (1)$$

$$(N_1 - XN_3)/(X+1) = N_2 \qquad (2)$$

Therefore, the mechanical output power by the first motor will be a multiplication of revolution number (rpm)×torque, and then, $T_1 \times N_1$ provided that there is no friction loss. The mechanical output power from the second motor will be a multiplication of revolution number (rpm)×torque, and then, $T_3 \times N_3$. Therefore, the mechanical output power of the final driving shaft will be a multiplication of revolution number (rpm)×torque, and then, $T_2 \times N_2$. Accordingly, $$T_2 \times N_2 = T_1 \times N_1 - T_3 \times N_3 \qquad (3)$$

Then, the torque of the driving shaft is twice of the torque of the driving (first) motor where X=1. The revolution number $N_2$ is a half of the revolution number of the first motor when the revolution of the second motor is zero, i.e. does not rotate, and X=1.

Further, the torque relationship between the first and second motors is as follows;

$$XT_1 = T_3 \qquad (6)$$

In mode 1, the rotation of the output driving final shaft will raise to $(N_1 - XN_3)/(X+1)$, and the torque thereof will raise to $(X+1)T_1$.

Next, in the mode 2, both shafts of the first and second motors rotate in the same direction.

$$(N_1 + XN_3)/(X+1) = N_2 \qquad (4)$$

Then, the mechanical power of the first motor is the revolution (rpm)×torque, i.e. $T_1 \times N_1$, provided with that there is no friction loss.

Therefore, the mechanical power of the second motor is the revolution (rpm)×torque, i.e. $T_3 \times N_3$. Then, the mechanical power of the output driving shaft is the sum of the powers of the first and the second motors.

$$T_2 \times N_2 = T_1 \times N_1 + T_3 \times N_3 \qquad (5)$$

Further, the relationship between the torques of the first and second motors is as follows:

$$XT_1 = T_3 \qquad (6)$$

Further, in a mode 3, the first and second motors rotate in the same rotation direction, so as to function as a generator.

$$(N_1 + XN_3)/(X+1) = N_2 \qquad (4)$$

Then, the mechanical power of the first motor is the revolution (rpm)×torque, i.e. $T_1 \times N_1$, provided with that there is no friction loss.

Therefore, the mechanical power of the second motor is the revolution (rpm)×torque, i.e. $T_3 \times N_3$. Then, the mechanical power of the output driving shaft is the sum of the powers of the first and the second motors, and the revolution (rpm)×torque, i.e. $T_2 \times N_2$, but in the reverse rotation direction, i.e. minus mechanical power. Therefore, $$T_2 \times N_2 = -(T_1 \times N_1 + T_3 \times N_3) \qquad (7)$$

This equation shows that the output power is negative, or minus, i.e. mechanical input, generating a power.

As apparent from the above equations, both motors rotate in the same direction in the modes 2 and 3 as connected through a differential gear unit, and therefore, the rotation energy of both motors will be the torque×the number of revolution in the output driving shaft. Then, the mechanism in the modes 2 and 3 is equivalent to that of one motor, and it is not of any significance. However, if the mechanism can be operated in a combination of the mode 1, it will become of some significance. That is, if the mechanism is operated in the mode 1, it can effect: high efficiency even soon after the shaft begins to drive, or even when the vehicle starts to drive.

In the inventive motor mechanism, the mode 1 can effect efficiency among those modes, and further, a combination of the modes 2 and 3 will contribute to an effective mechanism as a while one.

Then, the shift among the modes can be carried out by using the switching means SWA and SWB, and this shift can be done by human handling or automatic control means. The mode 1 is directed to a lower speed mode, the mode 2 to a high speed mode, and the mode 3 to a braking mode.

When the mode of the mechanism is changed, it is necessary to change the rotation direction of the motor(s). For example, any time when it changes from the mode 1 to the mode 2 or 3, or from the mode 2 or 3 to the mode 1, the rotation direction of the motor should be reversely changed. At this time, the rotor of the motor is changed from a driver to a generator, or from a generator to a driver, so that the rotation direction is changed, and then, excessive current will flow in the coil of the motor, so as to break the motor. For preventing such phenomenon, and operating smoothly the motor, there should be some interval in which the motor is shut off from an electric source, and the driving force of the motor is changed so as to change rotation direction of the motor. Among such interval, the change of operation and rotation direction can be smoothly done.

In the other case, either when the mode is changed from the mode 2 to the mode 3, and when the mode is changed from the mode 3 to the mode 2, the rotation direction is the same. Then, a switch in the switching means SWA and SWB can change a connection from driving into regenerating, i.e. from a source to a regenerative means to be regenerated, or alternatively, reversely connecting for changing the mode 2 to the mode 3, or from the mode 3 to the mode 2.

FIG. 3 shows schematically a principle of the inventive motor mechanism. The mechanism has two motors; a first motor (A), a differential gear unit (B) and a second motor (C) in which a differential output power from the first and second motors drives the final power shaft (3). Basically the first motor acts as a driving motor, and the second motor acts as a generator, and between them, a differential gear unit is :provided with the rotation shafts of each motor engaged respectively with each gear shaft (e.g. side gear shaft) FIG. 3 shows a structure of the mechanism in the mode 1.

FIG. 9 shows a system of the inventive motor mechanism with switching means. In FIG. 9, two motors are provided with switching means to make the motor driving or generating. While the mechanism can be used for an electric vehicle, it can be used as a general power source. The first and second motors are connected through a differential gear unit, and each motor can be a driving motor or a generating motor, and then the selection therefrom can be made in view of driving condition, operating condition, so as to take most appropriate driving force and efficiency. The inventive mechanism can enable to ensure a most efficient operation or driving.

|        | motor revolution                                  | operation           |
|--------|---------------------------------------------------|---------------------|
| FIG. 3 | maximum revolution number is lower                | simpler construction |
| FIG. 9 | same revolution number as that of the driving motor | more complicated   |

Figure 10:
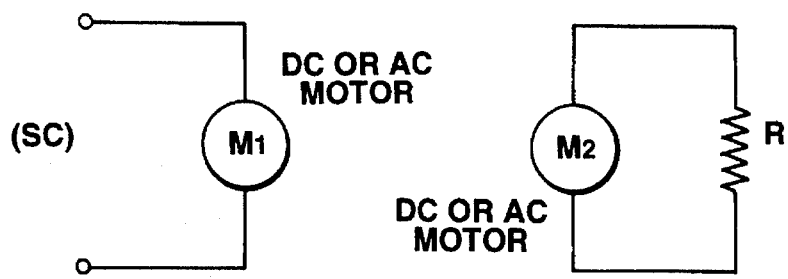
FIG. 10 shows schematically one example of control circuit for the inventive motor mechanism.

FIG. 10 shows a switching structure when the first motor is a driving motor, and the second motor is a generator.

1. A load resistance is provided at a source terminal of the second motor (M2). The power as generated will consumed in this resistance, and then the energy loss will be higher. But the circuit is simple and generic, (so that the motor mechanism can be utilized in all kinds of industries including a small size motor means.) Further, any kinds of motors including AC motor, DC brush motor and DC brushless motor can be used in the motor mechanism of the present invention. Further, the inventive motor mechanism can efficiently rotate from the range of the revolution number of 0. Therefore, when the driving motor is a DC motor, a loading on the driving motor will not dramatically raise even at the time of stopping the rotation due to excessive mechanical load from the outside. There is no need of preventing the excessive current to a motor. Where the driving motor is an AC motor, it can be used in the range of the rotation having high torque even at the time of starting, i.e. the output shaft of zero rotation number.

In the mechanism, the torque of the rotation of the output final driving shaft can be adjusted by changing the regenerative power (load) of a regenerative motor. In the prior art, the torque adjustment is done by changing a current flowing the coil, or changing a magnetic flux in the motor. The inventive mechanism enables to adjust the torque of the final driving shaft by changing a regenerative power as generated in the second motor, or changing the load resistance applied to the second motor. The load resistance may be changeable.

Then, the adjustment for regenerating the power as generated will be explained as follows: The power can be regenerated without voltage raising circuit. The magnetic flux in the second motor (M2) should be higher, or the rotation rate thereof should be increased by increasing a ratio of teeth numbers in the differential gear box, for raising the voltage of the power to be regenerated.

The electromotive force E has the following relationship with the revolution number N and the magnetic flux E $[V]=K \times N \times \phi$ wherein K is a coefficient.

Therefore, the regeneration can be carried out without raise of voltage, as follows:

Firstly, the revolution number of the shaft of M1 should be higher than that of M2 by adjusting the ratio of teeth numbers in the differential gear box.

Secondly, the magnetic flux in M1 should be higher than that of M2. Further, the power as generated is charged in the other battery.

Figure 11A:
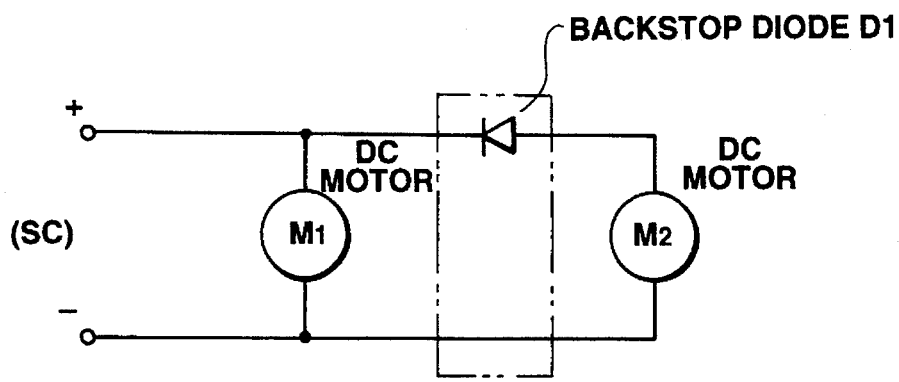
FIG. 11 shows schematically another example of control circuit for each of the motors used in the inventive motor mechanism.

2. FIG. 11A shows schematically a circuit for directly regenerating the power as generated by the M2, through a backstop diode D1 into the M1. Both of M1 and M2 are a direct current motor. A diode D1 is a back stop diode through which the generated current flows directly into the M1.

Figure 11B:
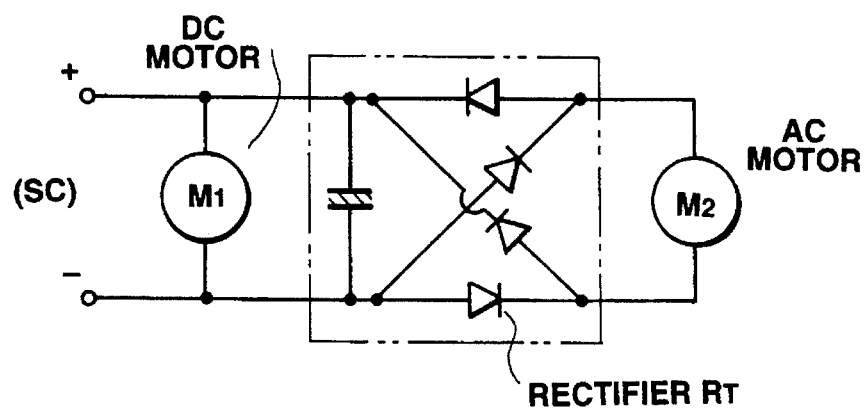

3. FIG. 11B shows schematically a circuit of the same function as that of FIG. 11A, but in which a rectifier RT is used in place of a backstop diode, and M2 is an alternating current motor, and M1 is a DC motor. A transistor can be used as a rectifier, but the other semiconductor element including a thyristor, GTO, IGBT, and FET can be used.

4. A regenerative power is charged in a battery as follows: A constant voltage circuit is provided between a backstop diode (when M2 is a DC motor), or a rectifier (when M2 is an AC motor) and a battery. Because the power as generated in M2 does not usually a constant voltage, the shift of the voltage should be removed in this circuit, so as to charge in a battery in a constant voltage.

Figure 12A:
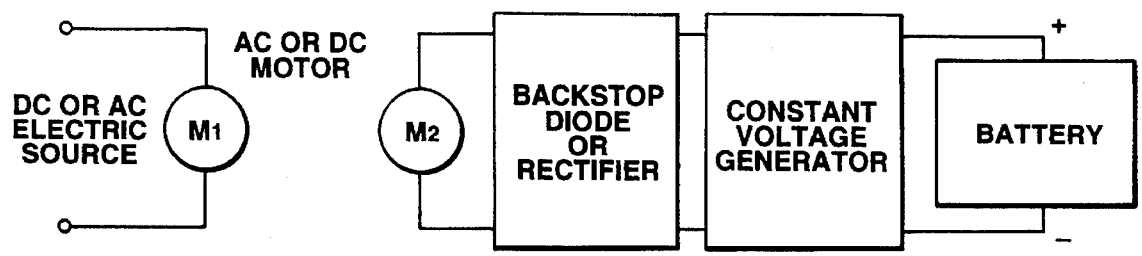
FIG. 12 is a schematic illustration of regenerative and adjustive control circuit for the inventive motor mechanism.
Figure 12B:
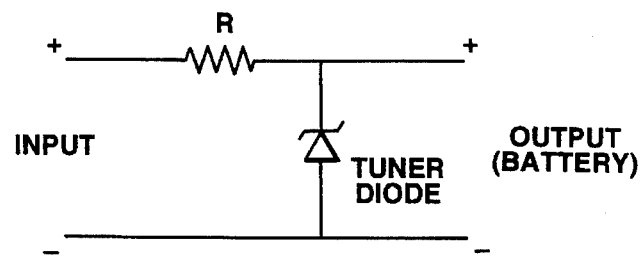

Therefore, a switching means therefor is schematically illustrated in FIG. 12A, and the constant voltage maintenance circuit therefor in simplest structure can be illustrated in FIG. 12B.

Figure 13:
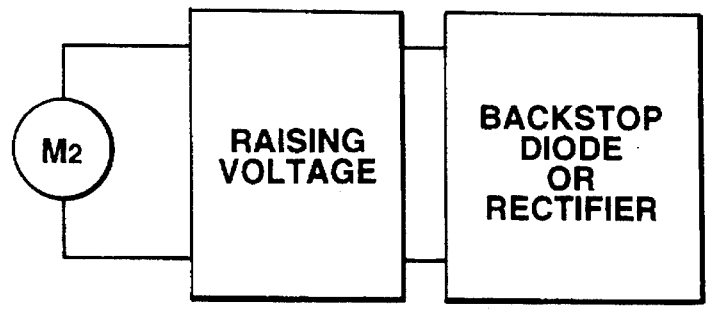
FIG. 13 shows a schematic illustration of regenerative and adjustive voltage raise circuit for a motor used in the inventive motor mechanism.
Figure 13:
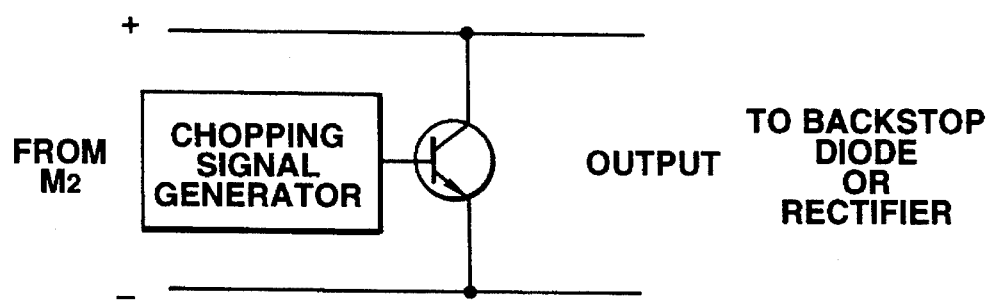
Figure 13:
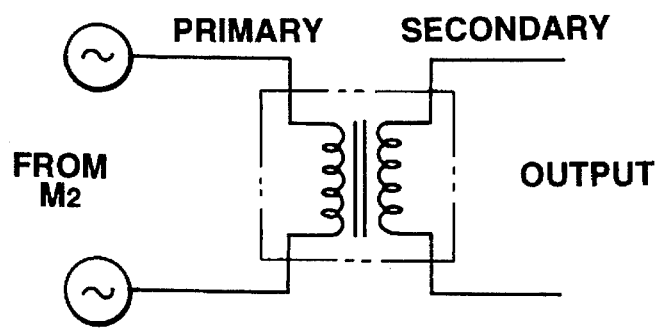

5. Where enough electromotive force can not obtained by the methods described in the above items 2, 3 and 4, and the power cannot be regenerated, a voltage raising circuit should be provided between the M2 and the backstop diode or the rectifier so that the electromotive force of M2 should be raised to regenerate easily. The composition of such circuit is schematically shown in FIG. 13A. Herein, M1 is a DC or AC motor, and M2 is a DC or AC motor too.

An embodiment of the voltage raising circuit is illustrated in FIG. 13B in which M2 is a DC motor, and FIG. 13C in which M2 is an AC motor. The circuit of FIG. 13B has a chopping signal generator for generating chopping signals, and therefore, the power as generated is chopped to raise the voltage.

In the circuit of FIG. 13C, the voltage of the power as generated by M2 can be raised by transformer.

6. In the above 2, 3, 4 and 5, the rotation speed of M2 will be reduced along with the raise of the rotation speed of the output shaft, so as to lower the voltage and thereby the power can be regenerated when the rotation speed is higher than the certain velocity. Under such condition, load of M2 approaches to zero, and the torque of the output shaft is reduced, and the velocity of the output shaft raise no more. This means that the loading of generating balances the loading of driving, so that the sum of the loadings will cause the loading torque of the output shaft. The torque and rotation velocity of the output shaft will raise and approach to the corresponding limits, the circuit shown in FIG. 14. The limits are corresponding to that when the teeth number ratio in the differential gears box is 1:1, the maximum output rotation velocity is (the rotation velocity of the driving shaft of the first motor)/2, i.e., there is no rotation of the shaft of the generator motor), and The output torque is (driving torque+generating torque).

Figure 14:
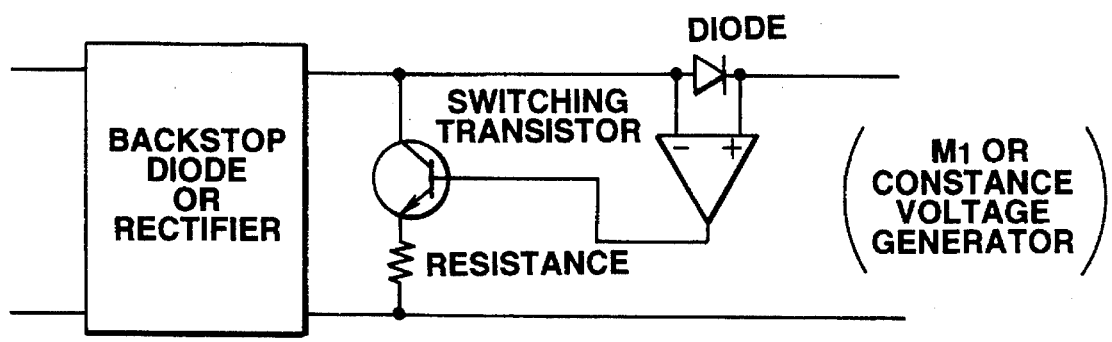
FIG. 14 shows a schematic illustration of one example of regenerative and adjustive control switching circuit for maintaining generating torque even when a regenerative voltage is lower.

As shown in FIG. 14, a loading circuit is provided between a backstop diode or a rectifier and M1 or a constant voltage circuit. The loading circuit as shown in FIG. 14 is provided in a adjusting circuit 2, 3, 4 and 5.

An operation amplifier compares the voltage at an input terminal with that at an output terminal of the diode, so that when the voltage at the input is higher than that at the output, it should judge no regeneration, and a switching transistor is turn on, so as to cause the regenerative current flowing in the resistance. Under this condition, the drop of the voltage by the diode should be considered. When there is no regeneration, the voltage at the input to the diode will be higher, so that a current should flow in the resistance by turning off a switching transistor. Thereby, even when there is no regeneration, the loading should be applied on M2.

Next, the first motor (M1) is used as a driver or a generator, while the second motor (M2) is used as a driver or a generator.

Figure 15:
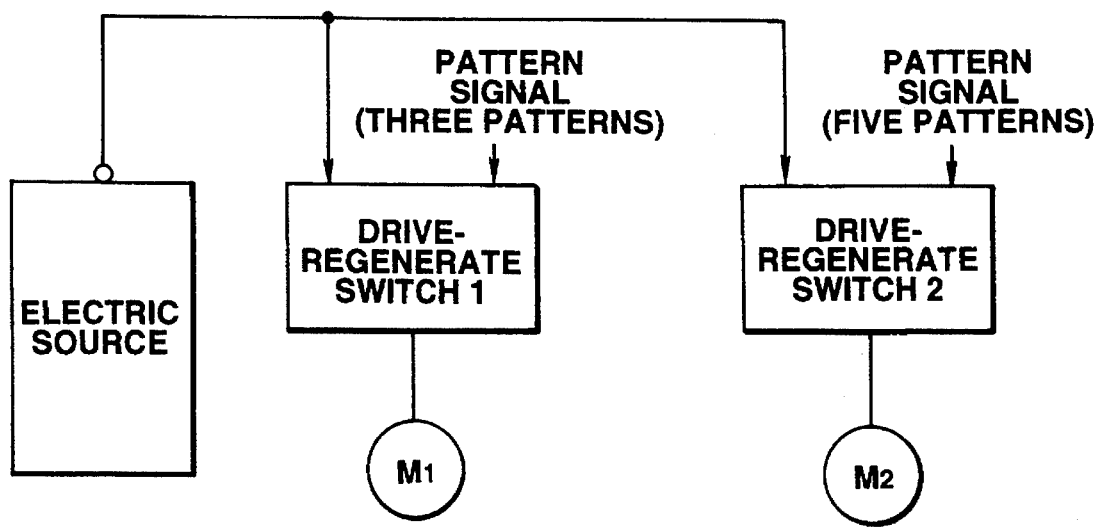
FIG. 15 is a schematic illustration of one example of regenerative and adjustive switching circuit for the inventive motor mechanism.

FIG. 15 shows schematically a switching means.

In FIG. 15, pattern signals are put into a switching circuit 1 which will regulate the operation of the first motor M1, while other pattern signals are put into a switching circuit 2 which will regulate the operation of the first motor M2. There are three patterns to operate the motors. In accordance with the pattern signals, the motor M1 will be on for driving. For the backward driving, the switching circuit 1 makes the motor M1 off to drive, and on to regenerate, and the switching circuit 2 makes the motor M2 on to drive and off to regenerate. For forward driving, the switching circuit 1 makes the motor M1 on to drive, and the switching circuit 2 makes the motor M2 on to generate for regeneration. In this mode, the motor M1 rotates reversely to the rotation of the motor M2, and the output final driving shaft rotates forward in the same direction as that of the first motor M1.

A switching circuit 1 to switch a motor M1 is provided for M1. There are three patterns for operation of the motor mechanism.
1. Driving situation: electric supply ot M1: M1 to drive.
2. Regenerating situation: the power as generated by the motor M1 is regenerated into a battery; M1 to regenerate.
3. Off situation: the circuit to drive the motor M1 is open; M1 is off.

The motor M2 is provided with a switching circuit 2 which is operated by the following five signal patterns.
1. Driving situation (forward): M2 is electrically supplied to turn in the same direction as M1.
2. Driving situation (forward): M2 is electrically supplied to turn in the reverse direction to M1.
3. Regenerative situation (forward): regenerated from M2 in the same rotation direction.
4. Regenerative situation (reverse): regenerated from M2 in the reverse rotation direction.
5. Off situation: circuit for operating M2 is open: source cut; M2 cut.

The two motors can be operated by combination of a switching circuit 1 and circuit 2, to enable appropriate driving for vehicle. The combinations have 3 patterns×5 patterns=15 patterns. Among those combinations, meaningless ones should be omitted, e.g. M1 driving+M2 reverse driving is impossible. Then, the possible combinations are shown in Tables 1 and 2. Further, the actual modes are illustrated in Table 2.

TABLE 1

| mode | M1 pattern | M2 pattern |
|---|---|---|
| low speed mode | M1 drive | M2 reverse rotation |
| high speed mode | M1 drive | M2 forward rotation |
| braking mode | M1 regenerate | M2 forward rotation |
| back mode | M1 regenerate | M2 reverse rotation |
| idling mode | M1 drive | M2 off |
| off mode | M1 off | M2 off |

TABLE 2

| mode (condition) | features |
|---|---|
| low speed mode | differential ratio = 1:1, output rotation speed = (rotation speed of M1 - rotation speed of M2)/2 output torque = (M1 torque + M2 torque) from starting to low speed driving |
| high speed mode | differential ratio = 1:1, output rotation speed = (rotation speed of M1 + rotation speed of M2)/2 output torque = (M1 torque + M2 torque) for high speed driving |
| braking mode | regenerating a running energy, saving a power; decreasing the speed on braking mode for braking, decreasing the velocity |
| back mode | differential ratio = 1:1, output rotation speed and output torque are the same as those of low speed mode. |
| idling mode | M1: driving, M2: off, before starting without any torque: before low speed mode, M1 and M2 rotate mutually reversely. |
| off mode | open to a source. |

Next, an interval switching means (rotation direction changer) for changing the rotation direction of M2 will be illustrated. Switching means 2 will change the rotation direction of M2 by pattern signals. Power would be lost, or higher load would be applied to the motor at the time of changing the rotation direction. Avoiding such loosing, the rotation direction can be smoothly changed by a switching means shown in a block diagram of FIG. 16.

Switch 1 pattern signals and switch 2 pattern signals for switching and controlling are fed through a rotation direction change circuit into each of pattern switching means 1 and a switching means 2, and respectively modulated by trigger patterns from the rotation direction changing circuit trigger output into switch 1 pattern signals and switch 2 pattern signals, and then, is respectively fed into a switching means 1 and 2 to regulate respectively the motors M1 and M2.

Figure 16:
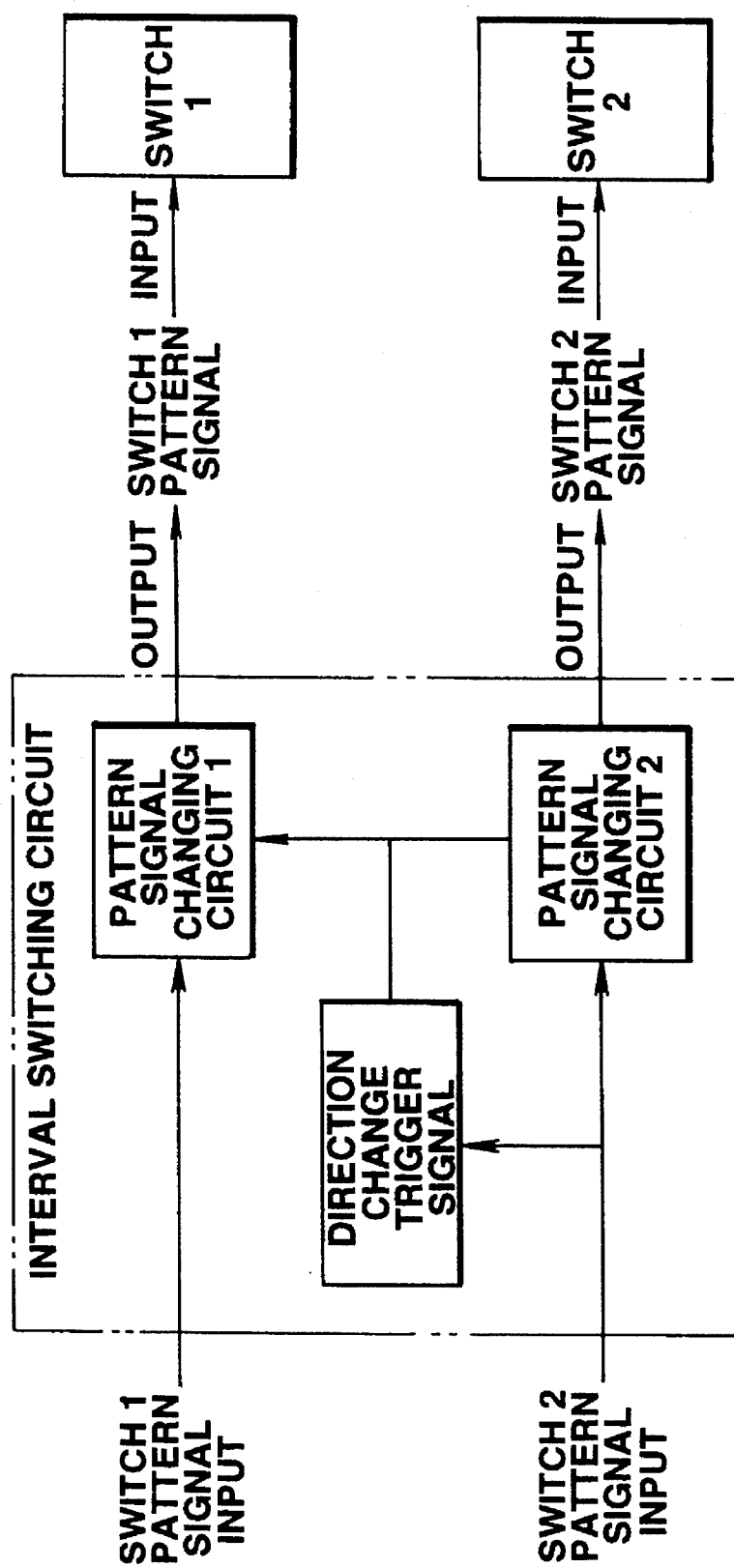
FIG. 16 is a schematic illustration of one example of rotation switching circuits for the inventive motor mechanism.

In a block diagram of FIG. 16, a trigger output signal for changing the rotation direction will be one pulse for trigger output signal through the following pattern signal input way. Therefore, a width of the pulse can be optionally determined.
1. When a switch 2 pattern signal will change from M2 reverse regenerating to M2 forward driving.
2. When a switch 2 pattern signal will change from M2 forward regenerating to M2 reversely driving.

A pattern signal switch 1 will change the switch 1 pattern input signals, while the trigger signal comes from the rotation direction changing trigger output.

1. When M1 is driven, M2 will regenerate.
2. When M1 regenerates, M2 will be driven.

Then, the pattern signal changing switch 2 will change the switch 2 pattern signal input to open the circuit to M2, while a trigger pulse comes from a direction change trigger output.

Next, the switching methods will be illustrated when both motors are a DC brush motor or a DC brushless motor.

Figure 17A:
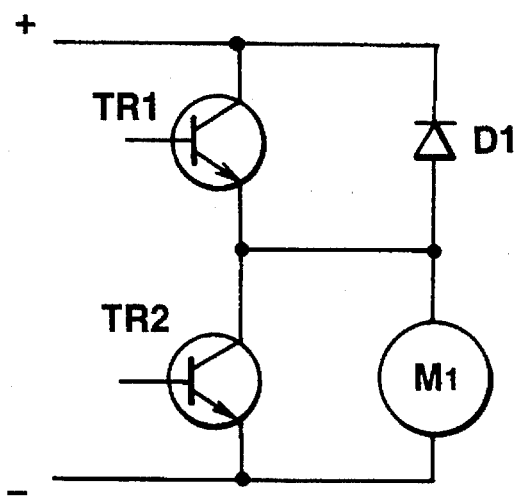
FIG. 17 is a schematic illustration of regenerative and adjustive switching circuits for a brush DC motor used in the inventive motor mechanism.
Figure 17B:
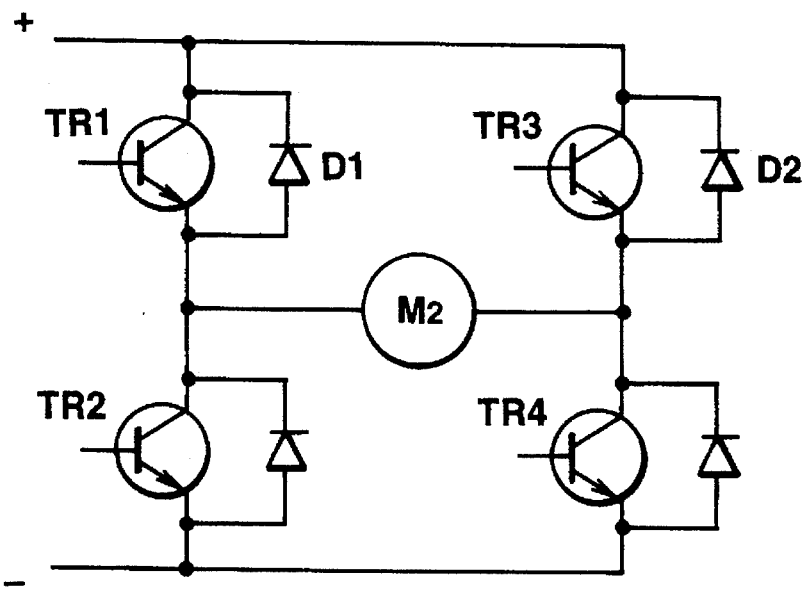

Switching means 1 and 2 are illustrated in FIGS. 17A and 17B when both of M1 and M2 are a DC brushless motor.

A switch 1 circuit as shown in FIG. 17A comprises transistors TR1 and TR2 to do switching.

1. M1 driving; TR2 is off, TR2 is on. M1 is activated by applying a certain voltage.
2. M1 regenerating; TR1 is off, TR2 is exposed to chopping pulses to raise the electromotive force, the raised voltage current passes through a diode D1 into a battery.
3. M1 is cut; both of TR1 and TR2 are off.

A switch 2 circuit as shown in FIG. 17B comprises four transistors TR1, TR2, TR3 and TR4, and four diodes D1, D2, D3 and D4, to activate switching on the second motor M2.

1. M2 driving; TR2 and TR3 are off, TR1 and TR4 are on. A certain voltage is applied to the motor M2 to operate M2 rotating forward.
2. M2 reverse driving; TR2 and TR3 are on, TR1 and TR4 are off. A reverse voltage is applied to the motor M2 to operate M2 reversely rotating.
3. M2 regenerating; TR1, TR2 and TR3 are off, and TR4 is exposed to chopping pulses to raise the electromotive force of M2. The raised voltage current passes through a diode D1 into a battery to be regenerated.
4. M2 reversely regenerating; TR1, TR3 and TR4 are off, and TR2 is exposed to chopping pulses to raise the electromotive force of M2. The raised voltage current passes through a diode D2 into a battery to be regenerated.

Figure 18A:
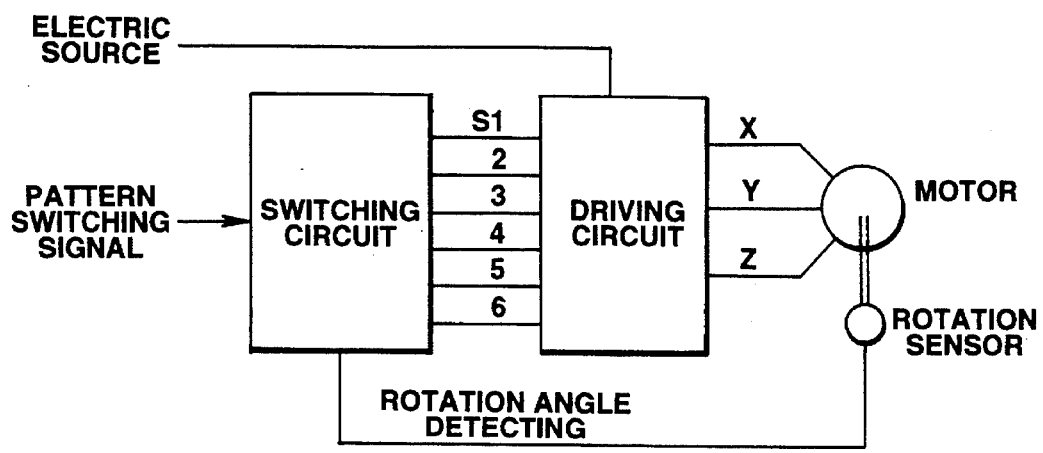
FIG. 18 is a schematic illustration of regenerative and adjustive switching circuit for a brushless DC motor used in the inventive motor mechanism.

Next, a switching means as shown in the Mock diagram of FIG. 18A is used to operate the mechanism using two DC brushless motors.

Figure 18B:
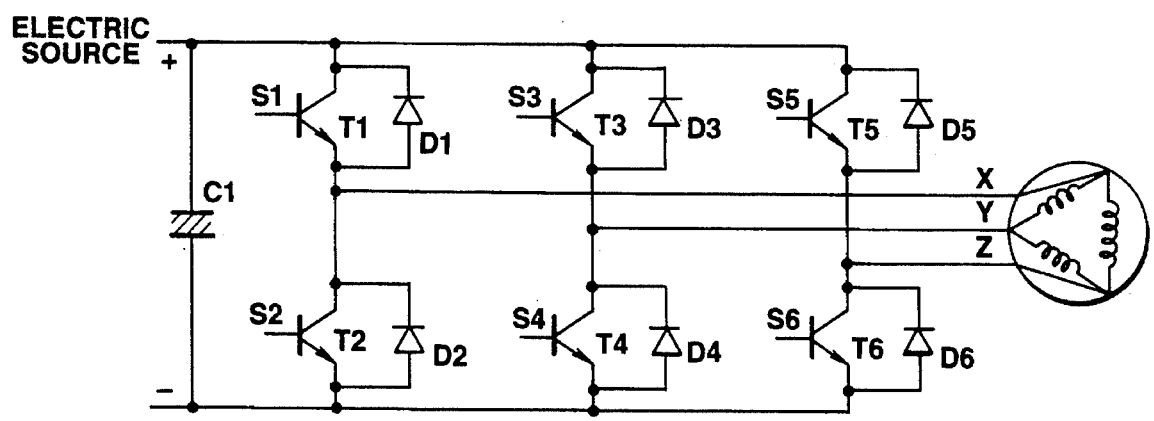

In the switching means of FIG. 18A, both of switching 1 and switching 2 is similarly done by detecting a rotation angle of the rotor of the motor with a rotation angle sensor and sending pattern switching signals to the switching means to regulate accurately. FIG. 18B shows a detail of the driving circuit in FIG. 18A.

Switching 1 as shown in FIG. 18A has three patterns to actuate the motor.

1. M1 driving; detecting a rotation angle of the rotor of the motor, and then actuating transistors corresponding the positions of the rotor, and supplying power (which is similar to the common actuating method).
2. M1 regenerating; S1, S3 and S5 are off, and S2, S4 and S6 are exposed to chopping pulses to raise the voltage of the generated power, and the raised voltage current passes through diodes D1, D3 and D5 into a battery to be regenerated.
3. M1 cut; All of transistors are off.

Switching 2 in FIG. 18A may have 5 driving patterns.

1. M2 driving; detecting a rotation angle of the rotor, actuating transistors corresponding to the detected positions to make on or off, to provide a rotation force to the same phase as that of M1.
2. M2 reverse driving; detecting a rotation angle of the rotor, actuating transistors corresponding to the detected positions to turn on or off, so as to provide a reverse rotation force to the same phase as that of M1.
3. M2 regenerating; turning off S1, S3 and S5, and applying chopping pulses to S2, S4 and S6 to raise the voltage, and the raised voltage returns to a battery.
4. M2 reverse regenerating; similar to that of M2 regenerating.
5. M2 cut; turning off all of S1 to S6.

A switching means switches a driving circuit on and switch off a regenerative circuit, so as to actuate a motor. When switching off a driving circuit, and on a regenerative circuit, an electromotive force as generated by a rotation of the motor M2 is treated by chopping signals generated in a regenerative circuit to boost the voltage of the power. The current having boosted voltage will pass through diodes D1, D3 and D5 to a battery for feeding the power to the motor. Where switching on a driving circuit, and off a regenerative circuit for the motor, the rotor of the other motor will rotate reversely with the switch thereof switching on the regenerative circuit and off the driving circuit for the other motor, and then, the electromotive force will be chopped with chopping signals by the switching means S1, S3 and S5 of the FIG. 18B, to raise the voltage by chopping-boosting in the circuit of FIG. 18B, and then the current with raised voltage passes through the diodes D2, D4 and D6.

We have illustrated the switching operation of a brush motor and a DC brushless motor in the above description. Herein, a transistor element is used as a switching element, but it should not limit to, and then, the other semiconductor and relay element such as thyristor, GTO, IGBT and FET can be used for switching elements.

Among the modes; i.e. low speed mode, high speed mode and braking mode, one can operated by hand-shifting, and further, operated automatically.

Next, such automatic operation for driving the motor mechanism will be illustrated below in reference with FIG. 19. The block diagram of FIG. 19 shows electronic control system.

Figure 19:
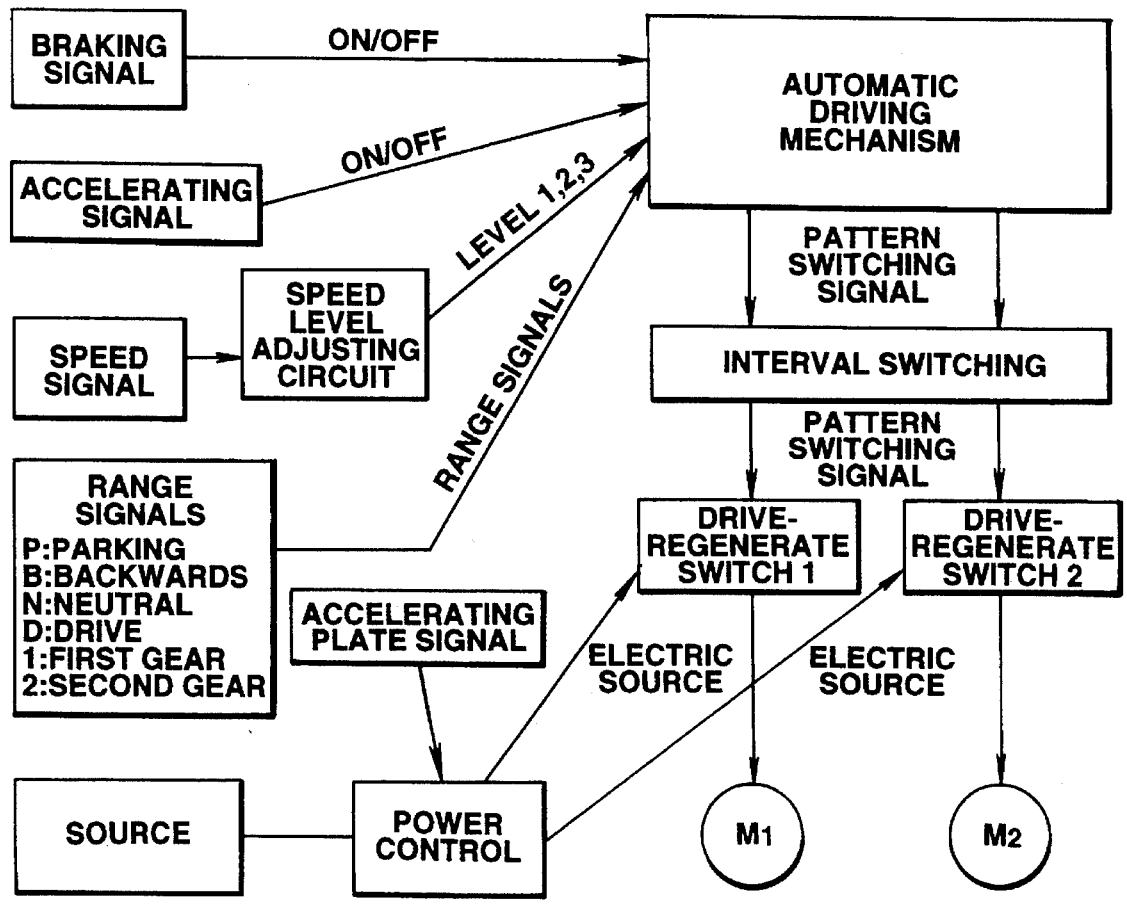
FIG. 19 is a schematic illustration of control means for automatic driving of a vehicle using the inventive motor mechanism.

The inventive motor mechanism can be automatically and appropriately operated by a variety of driving signals shown in FIG. 19. The relationship of the driving modes with driving input signals to the motor mechanism of the present invention is schematically shown in a table of FIG. 20. A braking has two ways; on or off, accelerating signals are only two; on or off; and further, the velocity of the vehicle has three ways; low speed, medium speed and high speed. Then, the number of the ways is 2×2×33=12. We can conceive 12 ways.

Further, the driving modes may include P:parking, B:backward driving, N;neutral, and D;driving. The condition that braking is on, and accelerating is on is meaningless. Further, parking in high speed mode, low speed mode and the like is meaningless.

Further, the inventive motor mechanism can be adjusted appropriately.

The present invention is further illustrated by the following examples, but should not be interpreted for the limitation of the invention.

EXAMPLE 1

Figure 4:
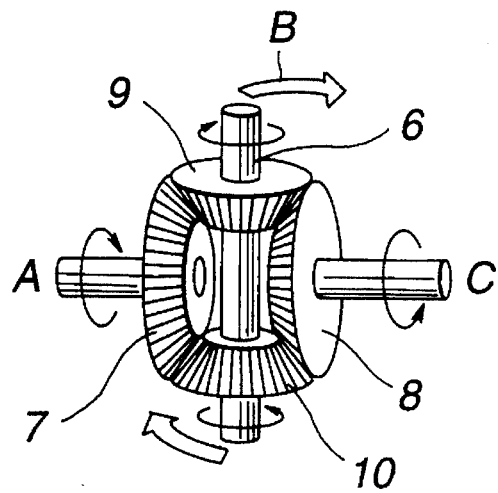
FIG. 4 shows a schematic illustration of one example of the inventive motor mechanism.

FIG. 4 shows schematically one preferred embodiment of the differential gear unit used in the inventive motor mechanism.

In the differential gear mechanism 3, the rotor 2 of the first motor connects a side gear 7 of the differential gear unit 3 which will rotate pinion gears 9 and 10 which is mounted on a pinion shaft 6, which will rotates as a arrow indicates, or can rotate reversely. This rotation force will drive a final driving shaft. A pinion shaft 6 has a differential pinion gears 9 and 10 which will rotate around the side gear shafts, and rotate itself as shown. On the other hand, the pinion gears are engaged with the other side gear 8, and turns the side gear 8. This side gear connects the rotation shaft 4 of the second motor B.

Therefore, if the pinion gear case rotates with the rotation of the differential gear case, the rotation shaft 2 of the first motor A and the rotation shaft 4 of the second motor will rotate in the same direction, and at the same time, the output shaft 3 will rotate in the same direction. Further, when the revolution number of the rotating shaft 4 of the second motor is zero, the output shaft 3 will rotate at the half revolution number of that of the rotating shaft 2 of the first motor ( wherein the ratio of the teeth numbers in the differential gear unit is 1:1). When the revolution number of the output shaft 2 is zero, the rotation shaft 4 of the second motor B will rotate in the reverse direction to that of the first motor A at the same revolution number, wherein the ratio of the gear teeth numbers in the differential gear box is 1:1.

EXAMPLE 2

Figure 5:
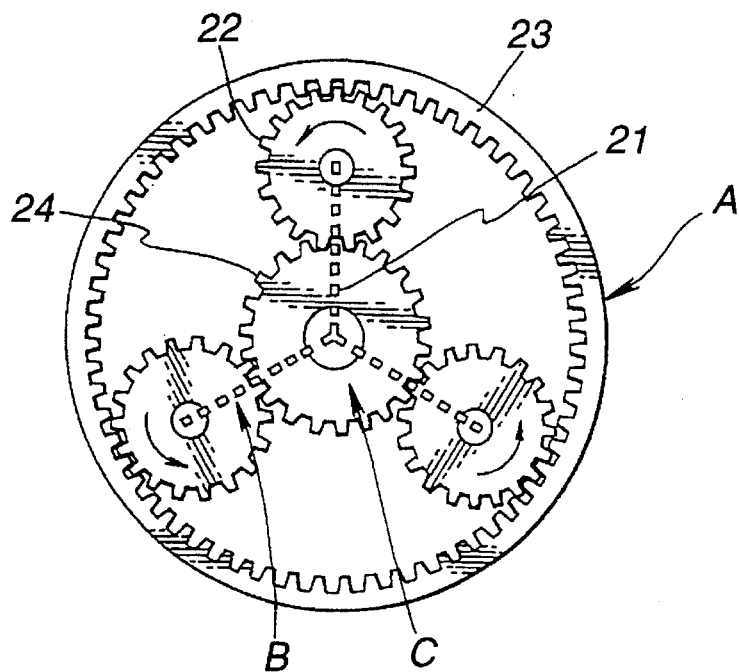
FIG. 5 is a schematic illustration of one example of the differential unit used in the inventive motor mechanism.

FIG. 5 shows schematically one preferred embodiment using a planetary gear, of the differential gear unit used in the inventive motor mechanism. That is, the differential gear unit is a planetary gear in this example. A sun gear 24 connects the rotation shaft A of the first motor, and is engaged with a planetary pinion gear 22, while an internal gear 23 connects the rotating shaft C of the second motor, and is engaged with a planetary pinion gear 22. Further, a planetary carrier 21 on which the planetary pinion gear is mounted connects an output shaft 3. In a sun-planetary gear, when either of a sun gear 14, a planetary carrier (arm) 21 and an internal gear 23 is fixed, the force from the other gear will raise or reduce the rotation of the another gear. The rotation shaft 2 in FIG. 4 corresponds to the sun gear 24, and the rotation 4 corresponds to the internal gear 23, and further, the rotation driving shaft 3 corresponds to the planetary carrier 21.

Figure 27:
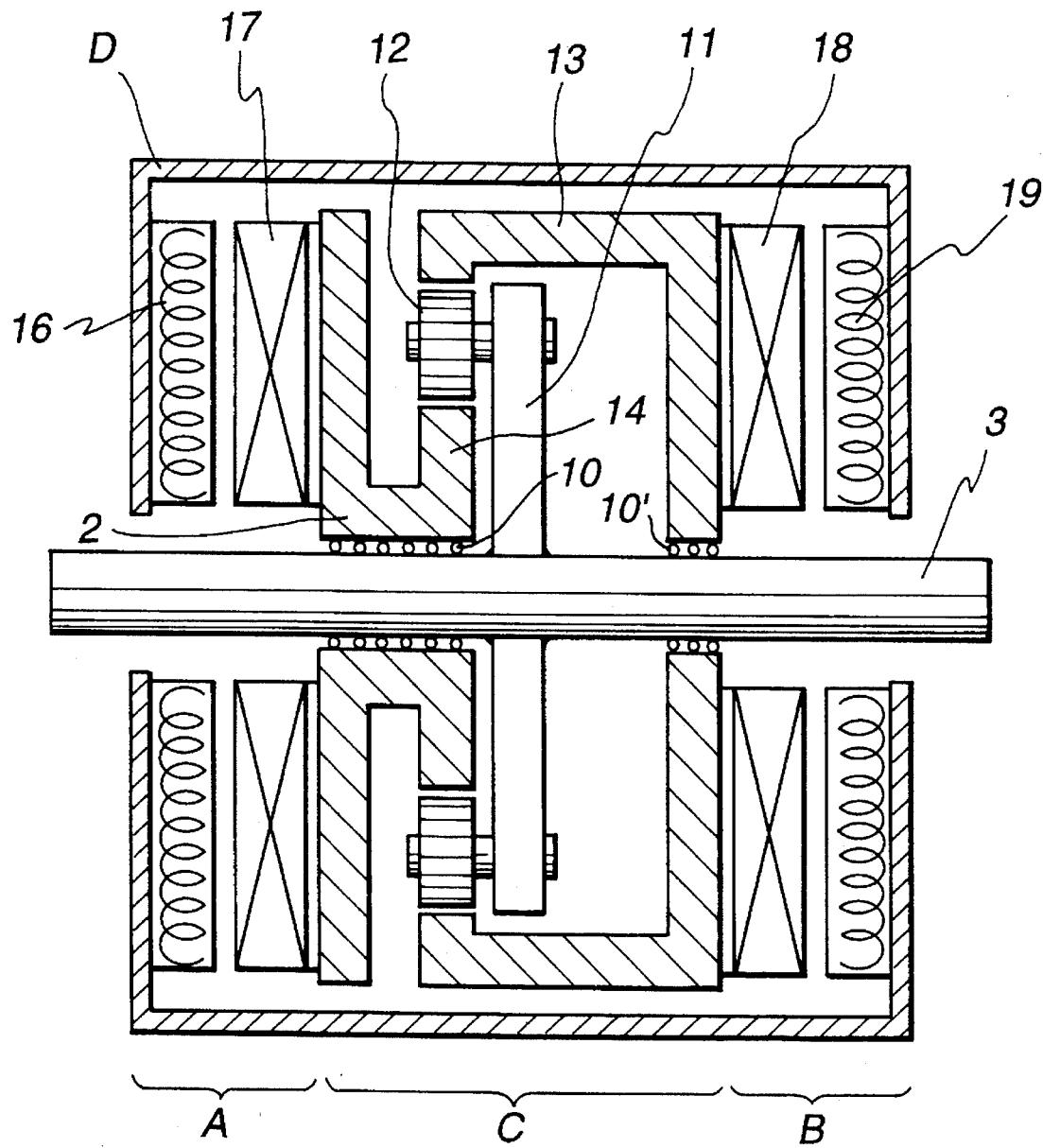
FIG. 27 is a schematic illustration of sectional view of one example of the integration of two DC motors and differential gear unit in accordance with the present invention.

A concrete example of such mechanism integrated with two DC motors is shown in FIG. 27. The first motor is essentially composed of a motor coil fixed 16 and a motor rotor (magnet) 17, in which a shaft 2 provided with the magnet (rotor) will rotates by means of a bearing 10, around an output driving shaft 3. A sun gear 14 fixed on the shaft 2 (and the magnet) is engaged on a planetary gear 12 which is fixed on a planetary carrier 11. The planetary carrier is fixed with a output driving shaft 3, and rotates. On the hand, the planetary gear 12 is engaged on an internal gear 13 in the outside of the planetary gear 12.

On the back side of the internal gear 13, a magnet (rotor) 18 of the second motor B is fixed, and against this magnet, a coil 19 of the second motor is fixed on a case. The internal gear 13 rotates on a bearing 10' around the output driving shaft 3. Therefore, the coil 16 of the first motor A, and the coil 19 of the second motor B are fixed on the frame D. The first and second motors are a DC motor.

EXAMPLE 3

Figure 21:
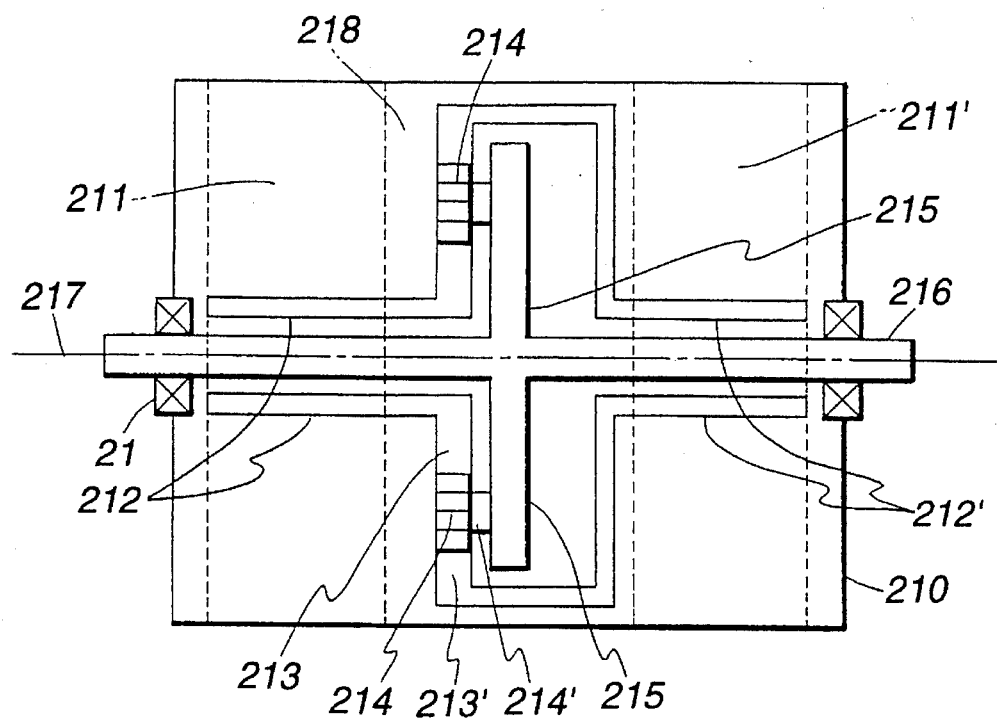
FIG. 21 shows a schematic illustration of sectional example of the inventive motor mechanism.

FIG. 21 shows schematically one preferred embodiment of the differential gear unit used in the inventive motor mechanism. This illustration is a simplification from the embodiment of FIG. 27. Rotor shafts 212 and 212' respectively of the first 211 and second motors 211' are provided coaxially on the output driving shaft 216, which is a planetary carrier 215. A planetary pinion gear 214 is rotatably mounted through a pinion shaft 214' on this planetary carrier 215. The planetary carrier 215 is provided through a bearing 21 on a rotating shaft 217.

This planetary pinion gear 214 is engaged on both of the internal gear 213' and the sun gear 213, and then the sun gear is fixed on (connects) the rotor shaft 212 of the first motor, while the internal gear 213' is fixed on (connects) the rotor shaft 212' of the second motor.

Both of the sun gear 213 and the internal gear 213' have a hollow therein, to allow the output driving shaft 216 passing therethrough. Two DC motors 211 and 211' are mutually facing, inserting the planetary pinion gear 214 therebetween, and integrated within a case 210 for the two motors. The output driving final shaft 216 is rotatably mounted on the bearings 21 at the both ends of the case 210. The two motors 211 and 211' may be a DC brush motor or a DC brushless motor or an alternating current motor, and have a hollowed rotor shafts 212 and 212' of the motors.

A DC brushless motor with a rotation angle detector is preferable, and further, the first motor and the second motor are interchangeable, and may be interchanged if necessary.

EXAMPLE 4

Figure 22:
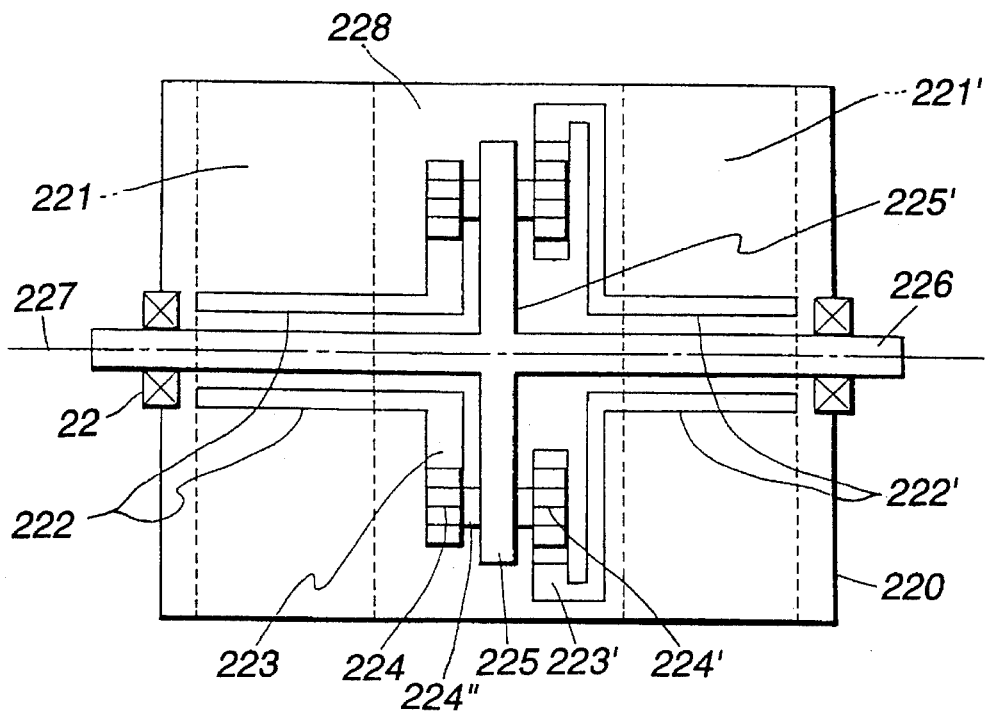
FIG. 22 is a schematic illustration of sectional view of another example of the inventive motor mechanism.

FIG. 22 shows schematically one preferred embodiment of the differential gear unit used in the inventive motor mechanism. In FIG. 22, two pinion gears 224 and 224' are used in place of the one planetary pinion gem: of FIG. 21, so that the gear change ratio can be changed and adjusted. Rotor shafts 222 and 222' respectively of the first 221 and second motors 221' are provided coaxially on the output driving shaft 226, which is a planetary carrier 225. Planetary pinion gears 224 and 224' are each rotatably mounted on this planetary carrier 225. Planetary pinion gears 224 and 224' are mounted at both ends of a pinion shaft 224" rotatably mounted on the planetary carrier 225. The planetary carrier 225 is provided through a bearing 22 on a rotating shaft 227.

This planetary pinion gear 224 is engaged on the sun gear 223, and the planetary pinion gear 224' is engaged on the internal gear 223'. Then the sun gear 223 is fixed on (connects) the rotor shaft 222 of the first motor, while the internal gear 223' is fixed on (connects) the rotor shaft 222' of the second motor.

Both of the sun gear 223 and the internal gear 223' have a hollow therein, to allow the output driving shaft 226 passing therethrough. Two DC motors 221 and 221' are mutually facing, inserting the planetary pinion gear 224 therebetween, and integrated within a case 220 for the two motors. The output driving final shaft 226 is rotatably mounted on the bearings 22 at the both ends of the case 220. The two motors 221 and 221' may be a DC brush motor or a DC brushless motor or an alternating current motor, and have a hollowed rotor shafts 222 and 222' of the motors.

A DC brushless motor with a rotation angle detector is preferable, and further, the first motor and the second motor are interchangeable, and may be interchanged if necessary.

In this example, two pinion gears 224 and 224' having two different tooth numbers are used so as to change a gear ratio of the differential gear mechanism.

EXAMPLE 5

Figure 23:
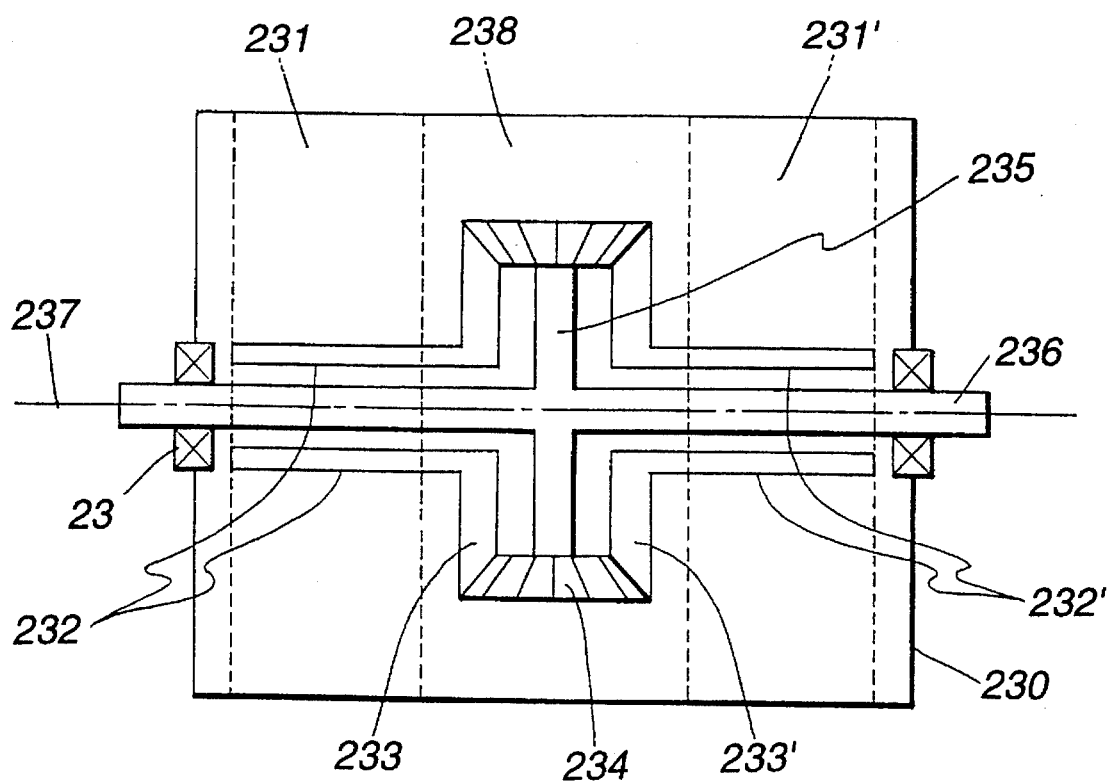
FIG. 23 is a schematic illustration of sectional view of other example of the inventive motor mechanism.

FIG. 23 shows schematically one preferred embodiment of the differential gear unit used in the inventive motor mechanism. FIG. 23 uses a differential gear mechanism as shown in FIG. 4.

In FIG. 23, rotor shafts 232 and 232' respectively of the first 231 and second motors 231' are provided coaxially on the output driving shaft 236, which is a pinion arm shaft 235.

The pinion arm 235 has at both end each of pinion gears 234 and 234' rotatabley mounted. The pinion gears 234 and 234' are engaged on both of the side gears 233 and 233'. Each of the side gears 233 and 233' is fixed on each of the rotors of the first and second motors 231 and 231'.

Both of the side gears 233 and 233' have a hollow therein, to allow the output driving shaft 236 passing therethrough. Two DC motors 231 and 231' are mutually facing, inserting the pinion gears 234 and 234' therebetween, and integrated within a case 230 for the two motors. The output driving final shaft 236 is rotatably mounted on the bearings 23 at the both ends of the case 230 having the first and second motors therein.

The two motors 231 and 231' may be a DC brush motor or a DC brushless motor or an alternating current motor, and have a hollowed rotor shafts 232 and 232' of the motors.

A DC brushless motor with a rotation angle detector is preferable, and further, the first motor and the second motor are interchangeable, and may be interchanged if necessary.

The above examples 3, 4 and 5 illustrate each of the inventive motor mechanism. Further, each of them can be provided in an integration case form, at the middle of the driving shaft having at the both ends wheels, with an actual differential gear box, in the same case. Therefore, the mechanism of the present invention can allow the driving and operating mechanism to be compacted. That is, the motor mechanism of the present invention is placed at the position near to the prior art differential gear box.

EXAMPLE 6

Figure 24:
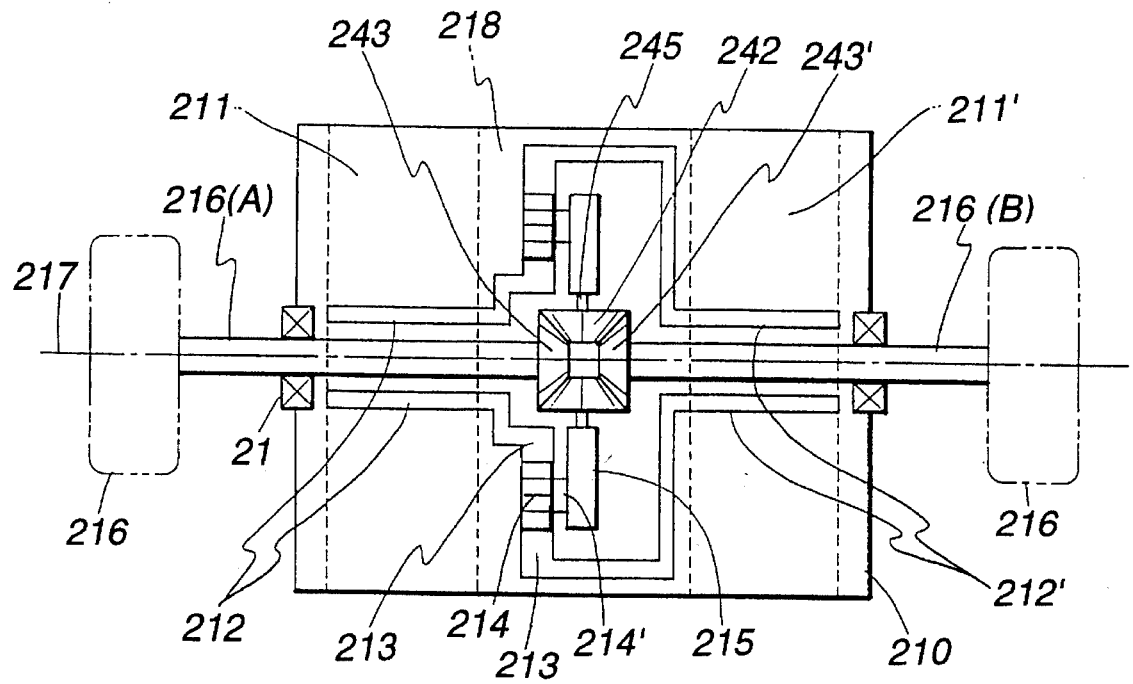
FIG. 24 is a schematic illustration of sectional view of differential gear means integrated with the motor mechanism of FIG. 21.

FIG. 24 shows schematically one preferred embodiment of integration of the inventive motor mechanism with differential gear box coaxially provided therein.

A differential gear box 240 to distribute in balance driving force to both of wheels is integrated between the output driving shaft 216 and the planetary carrier 215'. Therefore, an output driving rotor A and an output driving rotor B of the motors can connect directly each of the right and left wheels. The differential gear box 240 has a side gear 243 connecting a rotor A, a side gear 243' connecting a shaft B, and a pinion gear 242 engaged to both side gears. The pinion shaft 245 on which the pinion gears 242 are rotatably mounted is fixed on the planetary carrier shaft 215.

In this example, the planetary gear type mechanism of FIG. 21 with two different pinion gears is unified with an ordinary differential gear box. A pinion gear shaft 245 is fixed on the planetary shaft 225 through which a driving force is transmitted to the wheels. The side gears 243 and 243' connect each of the wheels, and then, the driving force can be transmitted to the right and left wheels.

EXAMPLE 7

Figure 25:
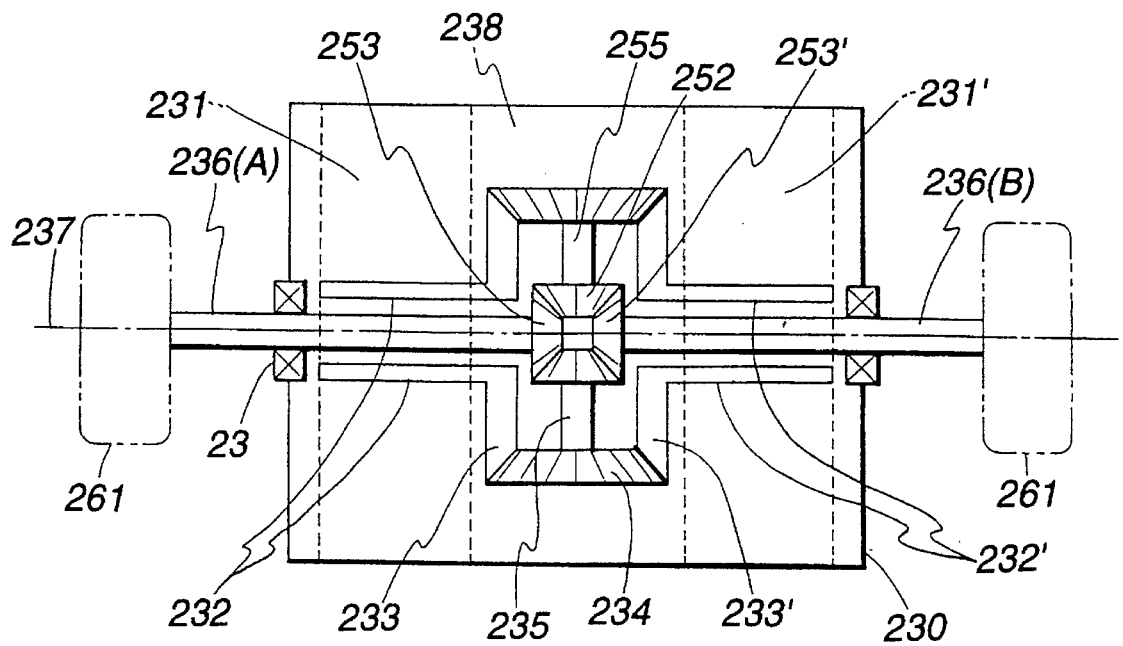
FIG. 25 is a schematic illustration of sectional view of differential gear means integrated with the motor mechanism of FIG. 23.

FIG. 25 shows schematically one preferred embodiment of integration of the inventive motor mechanism with differential gear box coaxially provided therein.

A differential gear box 250 to distribute in balance driving force to both of wheels is integrated between the output driving shaft 236 and the pinion gear shaft 235'. Therefore, an output driving rotor A and an output driving rotor B of the motors can connect directly each of the right and left wheels. The differential gear box 250 has a side gear 253 connecting a rotor A, a side gear 253' connecting a shaft B, and a pinion gear 252 engaged to both side gears. The pinion shaft 255 on which the pinion gears 252 are rotatably mounted is fixed on the planetary carrier shaft 235.

In this example, the differential gear type mechanism of FIG. 23 with two different pinion gears is unified with an ordinary differential gear box. A pinion gear shaft 255 is fixed on the pinion gear shaft 235 through which a driving force is transmitted to the wheels. The side gears 253 and 253' connect each of the wheels, and then, the driving force can be transmitted to the right and left wheels.

EXAMPLE 8

Figure 26:
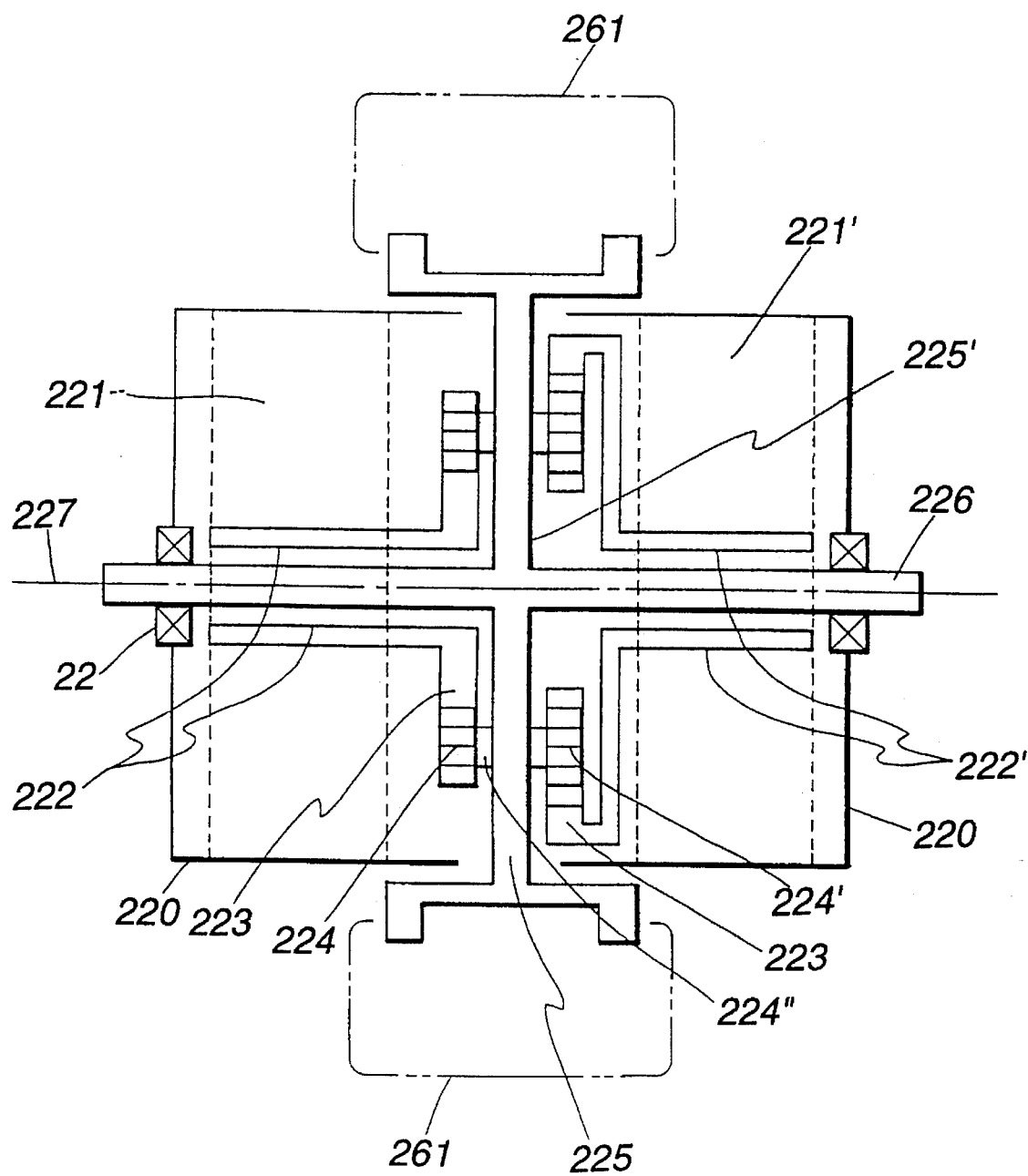
FIG. 26 is a schematic illustration of sectional view of the motor mechanism of FIG. 22, integrated within a wheel.

FIG. 26 shows schematically one preferred embodiment of integration of the inventive motor mechanism with differential gear box coaxially provided in a wheel. The integration with the motor mechanism of FIG. 22 in Example 5 can be compacted within a wheel.

Rotor shafts 222 and 222' respectively of the first 221 and second motors 221' are provided coaxially on the output driving shaft 226, which is a planetary carrier 225. Planetary pinion gears 224 and 224' are each rotatably mounted on this planetary carrier 225. Planetary pinion gears 224 and 224' are mounted at both ends of a pinion shaft 224" rotatably mounted on the planetary carrier 225. The planetary carrier 225 is provided through a bearing 22 on a rotating shaft 227.

This planetary pinion gear 224 is engaged on the sun gear 223, and the planetary pinion gear 224' is engaged on the internal gear 223'. Then the sun gear 223 is fixed on (connects) the rotor shaft 222 of the first motor, while the internal gear 223' is fixed on (connects) the rotor shaft 222' of the second motor.

Both of the sun gear 223 and the internal gear 223' have a hollow therein, to allow the output driving shaft 226 passing therethrough. Two DC motors 221 and 221' are mutually facing, inserting the planetary pinion gear 224 therebetween, and integrated within a case 220 for the two motors. The output driving final shaft 226 is rotatably mounted on a bearings 22 at the both ends of the case 220. The two motors 221 and 221' may be a DC brush motor or a DC brushless motor or an alternating current motor, and have a hollowed rotor shafts 222 and 222' of the motors. A tire wheel 261 is mounted on the outmost margin of the planetary gear shaft 225.

A driving force will be derived from the rotation force of the planetary pinion gear shaft 225, and the driving motor mechanism of the present invention can be compactly integrated within a case 220. The outmost end of the planetary gear shaft 225 constitutes a tire wheel 261, and therefore, a tire, a wheel and a driving mechanism can be unified compactly. Especially, this mechanism can be used in a bicycle to provide a compact automatic driving means.

This is not limited to a bicycle, and in general, a generic electric vehicle can use this mechanism. The mechanism of FIG. 26 can be used to operate independently each of the wheels.

Further, the mechanism of FIG. 23 in Example 5 can be integrated within a wheel in the structure similar to that of FIG. 26 in Example 8, with the pinion gear carrier having a wheel tire at the outmost margin thereof.

What is claimed:

1. A motor mechanism comprising a first motor; a second motor; and a differential gear unit;

wherein the differential gear unit essentially consists of three rotating members which are engaged mutually and rotate in constant differential ratio rates; the differential ratio being determined by the ratio of tooth numbers of gears mutually engaged;

a rotating shaft of the first motor corresponds to one of three members of the diferential gear unit;

a rotating shaft of the second motor corresponds to the other one of three members of, the diferential gear unit;

a differential pinion gear rotation axle shaft corresponding to the another of three members of the diferential gear unit will empower a drive axle shaft; and further, the rotating shaft of the first motor rotates in the differential speed with the rotating shaft of the second motor;

the difference of the revolution which is proportional to the difference between the revolution of the differential gear axle and the revolution of the rotating shaft of the first motor is generated between the revolution of differential gear axle and the revolution of the rotating shaft of the second motor so that when the difference is 0, the shafts of the first motor and second motor and the differential gear axle turn at the same rotation speed;

each of the first and second motors has a drive and regenerative switching means which switches to connect to a source or a regenerator in accordance with a given pattern, thereby the first and second motors function as a driving motor or a generator, in accordance with given pattern signals.

2. The motor mechanism in accordance with claim 1, wherein a low speed mode is in which said either of the first and second motors acts as a driving motor, and a high speed mode is in which both of the first and second motors acts as a driving motor, and the switching means can switch from the low speed mode to the high speed mode.

3. The motor mechanism in accordance with claim 1, wherein the differential gear unit essentially consists of three rotating members which are engaged mutually and rotate in constant differential ratio rates; the differential ratio being determined by the ratio of tooth numbers of gears mutually engaged;

a rotating shaft of the first motor corresponds to one of three members of the diferential gear unit;

a rotating shaft of the second motor corresponds to the other one of three members of the diferential gear unit;

a differential pinion gear rotation axle shaft corresponding to the another of three members of the diferential gear unit will empower a drive axle shaft; and further, the rotating shaft of the first motor rotates in the differential speed with the rotating shaft of the second motor;

the difference of the revolution which is proportional to the difference between the revolution of the differential gear axle and the revolution of the rotating shaft of the first motor is generated between the revolution of differential gear axle and the revolution of the rotating shaft of the second motor so that when the difference is 0, the shafts of the first motor and second motor and the differential gear axle turn at the same rotation speed;

each of the first and second motors is respectively provided with a drive and regenerative switching means which may switch to connect to a source or a regenerator in accordance with a given pattern, thereby the first and second motors function as a driving motor or a generator in accordance with pattern signals such as braking signal, accelerating signal, speed lebelling signal and range signal, which pattern signals are generated to actuate said drive and regenerative switching means, so as to operate automatically, and then, those pattern signals transmits through an interval circuit to said drive and regenerative switching means, the interval circuit can provide a period time for converting the rotation direction of the second motor shaft.

4. The motor mechanism in accordance with claim 1, wherein said differential gear unit is a planetary gear system which has three rotating members, i.e. an internal gear, a sun gear and a planet pinion set essentially consisting of planet pinions and a planet pinion carrier or cage mounted with a plurality of planet pinion engaged to both of the internal gear and the sun gear, said internal gear and said sun gear are respectively connected to each of shafts of the first motor and the second motor, and a shaft of said planet pinion carrier is an output driving shaft.

5. The motor mechanism in accordance with claim 1, wherein the differential gear unit is a differential gear box which has two differential side gears, and a plurality of pinion gears engaged to both of the side gears, and mounted on a differential pinion carrier rotating around coaxially to both side gears, wherein the rotating shafts of the first and second motors are respectively fixed on said two side gears, and the differential pinion carrier rotates in connection with an output final drive shaft.

6. The motor mechanism in accordance with claim 4, wherein the rotating shafts of the first and second motors and the differential pinion carrier shaft are coaxially arranged so that the first and second motors and the differential gear unit are integrated into one case.

7. The motor mechanism in accordance with claim 3, wherein the rotating shafts of the first and second motors and the differential pinion carrier shaft are coaxially arranged so that the first and second motors and the differential gear unit are integrated into one case.

8. A motor mechanism which comprises a first motor;

a second motor; and a differential gear unit;

wherein the differential gear unit essentially consists of three rotating members which are engaged mutually and rotate in constant differential ratio rates, the differential ratio being determined by the ratio of tooth numbers of gears mutually engaged;

a rotating shaft of the first motor corresponds to one of three members of the differential gear unit;

a differential pinion gear rotation axle shaft corresponding to the another of three members of the differential gear unit will empower a drive axle shaft, and further, the rotating shaft of the first motor rotates in the differential speed with the rotating shaft of the second motor;

the difference of the revolution which is proportional to the difference between the revolution of the differential gear axle and the revolution of the rotating shaft of the first motor is generated between the revolution of differential gear axle and the revolution of the rotating shaft of the second motor so that when the difference is zero, the shafts of the first motor and second motor and the differential gear axle turn at the same rotation speed;

wherein said first motor is electrically connected to an electric source so as to act as a driving motor, and the second motor is electrically connected to a regenerator so as to function as a generator;

power generated by said second motor is regenerated through a raising voltage circuit thereof, and adjusting the power, so as to regenerate the power.

9. The motor mechanism in accordance with claim 8, wherein said differential gear unit is a planetary gear system which has three rotating members, i.e. an internal gear, a sun gear an a planet pinion set essentially consisting of planet pinions and a planet pinion carrier or cage mounted with a plurality of planet pinion engaged to both of the internal gear and the sun gear, said internal gear and said sun gear are respectively connected to each of shafts of the first motor and the second motor, and a shaft of said planet pinion carrier is an output driving shaft.

10. The motor mechanism in accordance with claim 8, wherein the differential gear unit is a differential gear box which has two differential side gears, and a plurality of pinion gears engaged to both of the side gears, and mounted on a differential pinion carrier rotating around coaxially to both side gears, wherein the rotating shafts of the first and second motors are respectively fixed on said two side gears, and the differential pinion carrier rotates in connection with an output final drive shaft.

11. The motor mechanism in accordance with claim 8, wherein said rotating shafts of the first and second motors and the differential pinion carrier shaft are coaxially arranged so that the first and second motors and the differential gear unit are integrated into one case.

12. The motor mechanism in accordance with claim 8, wherein said power generated by the second motor returns through a backstop circuit directly to the first motor.

13. The motor mechanism in accordance with claim 9, wherein said rotating shafts of the first and second motors and the differential pinion carrier shaft are coaxially arranged so that the first and second motors and the differential gear unit are integrated into one case.

14. The motor mechanism in accordance with claim 10, wherein said rotating shafts of the first and second motors and the differential pinion carrier shaft are coaxially arranged so that the first and second motors and the differential gear unit are integrated into one case.

15. The motor mechanism in accordance with claim 9, wherein said power generated by the second motor returns through a backstop circuit directly to the first motor.

16. The motor mechanism in accordance with claim 10, wherein said power generated by the second motor returns through a backstop circuit directly to the first motor.

17. The motor mechanism in accordance with claim 11, wherein said power generated by the second motor returns through a backstop circuit directly to the first motor.

* * * * *